(12) United States Patent
Ono et al.

(10) Patent No.: US 7,896,115 B2
(45) Date of Patent: Mar. 1, 2011

(54) FUEL CELL VEHICLE

(75) Inventors: Tohru Ono, Kawachi-gun (JP);
Takayuki Ogawa, Utsunomiya (JP);
Akira Nakashima, Shioya-gun (JP);
Shujiro Nozaki, Utsunomiya (JP);
Takashi Kato, Wako (JP); Takaharu Sato, Wako (JP); Kenji Nagumo, Wako (JP); Kazunori Fukuma, Wako (JP); Takanori Moori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 769 days.

(21) Appl. No.: 11/428,695

(22) Filed: Jul. 5, 2006

(65) Prior Publication Data
US 2007/0007060 A1 Jan. 11, 2007

(30) Foreign Application Priority Data

| Jul. 8, 2005 | (JP) | ............................. 2005-200631 |
| Jul. 8, 2005 | (JP) | ............................. 2005-200632 |
| Jul. 8, 2005 | (JP) | ............................. 2005-200633 |
| Jul. 8, 2005 | (JP) | ............................. 2005-200634 |
| Jul. 8, 2005 | (JP) | ............................. 2005-200635 |
| Jul. 8, 2005 | (JP) | ............................. 2005-200636 |
| Dec. 7, 2005 | (JP) | ............................. 2005-353358 |

(51) Int. Cl.
*B60K 1/04* (2006.01)
(52) U.S. Cl. .................... 180/65.31; 180/68.3
(58) Field of Classification Search ............... 180/65.1, 180/65.21, 65.22, 65.275, 65.285, 65.29, 180/68.3, 68.5, 69.4, 69.5, 311, 312
See application file for complete search history.

(56) References Cited

U.S. PATENT DOCUMENTS

| 4,216,839 | A | * | 8/1980 | Gould et al. ............... 180/65.1 |
| 5,501,289 | A | * | 3/1996 | Nishikawa et al. ......... 180/68.5 |
| 5,641,031 | A | * | 6/1997 | Riemer et al. ................. 429/13 |
| 6,378,637 | B1 | * | 4/2002 | Ono et al. ................ 180/65.31 |
| 7,048,321 | B2 | * | 5/2006 | Bandoh et al. ............. 296/37.8 |
| 7,073,824 | B2 | * | 7/2006 | Uhara et al. ................ 280/834 |
| 7,270,209 | B2 | * | 9/2007 | Suess ........................ 180/69.5 |

FOREIGN PATENT DOCUMENTS

| JP | 06-321137 | 11/1994 |
| JP | 07-251637 | 10/1995 |
| JP | 2003-182378 | 7/2003 |
| JP | 2003-182379 | 7/2003 |

(Continued)

*Primary Examiner*—J. Allen Shriver, II
*Assistant Examiner*—Bridget Avery
(74) *Attorney, Agent, or Firm*—Rankin, Hill & Clark LLP

(57) ABSTRACT

A fuel cell vehicle includes: a vehicle body; a floor panel provided on the bottom of the vehicle body; a floor tunnel that is formed bulging upward in the center of the floor panel in the vehicle body width; a pair of front seats that are disposed on the floor panel, outside of the floor tunnel in the vehicle body width direction; center frames that support the floor tunnel, disposed at the center in the vehicle body width and extending along the vehicle body longitudinal direction; a sub-frame provided on the bottom of the floor panel and joined to the center frames; and a fuel cell stack mounted on the sub-frame and provided under the floor tunnel.

6 Claims, 25 Drawing Sheets

FOREIGN PATENT DOCUMENTS

| | | |
|---|---|---|
| JP | 2003-182624 | 7/2003 |
| JP | 2003-205754 | 7/2003 |
| JP | 2003-226267 | 8/2003 |
| JP | 2003-246277 | 9/2003 |
| JP | 2003-252252 | 9/2003 |
| JP | 2004-168101 | 6/2004 |
| JP | 2005-125956 | 5/2005 |
| JP | 2005-306104 | 11/2005 |
| WO | 03/094260 | 11/2003 |

* cited by examiner

FUEL CELL VEHICLE

BACKGROUND OF THE INVENTION

The present invention relates to a fuel cell vehicle.

1. Field of the Invention

Priority is claimed on Japanese Patent Applications No. 2005-200631, No. 2005-200632, and No. 2005-200633, No. 2005-200634, No. 2005-200635, and No. 2005-200636 filed Jul. 8, 2005, and Japanese Patent Application No. 2005-353358 filed Dec. 7, 2005, the contents of which are incorporated herein by reference.

2. Description of Related Art

In a fuel cell vehicle, a fuel cell stack is formed by stacking a plurality of unit fuel cells, and the fuel cell stack is mounted below a floor panel. In this type of fuel cell vehicle, it has been proposed to attach the fuel cell stack to a sub-frame, and join this sub-frame to the vehicle body skeleton portion, such as side frames of the vehicle, from the vehicle body bottom (see, for example, Japanese Unexamined Patent Application, First Publication No. 2003-182624).

Also, there is known a fuel cell vehicle in which a hydrogen sensor is disposed on the inside upper portion of a center tunnel formed in the bottom of a floor panel, and a silencer of the air supply piping to the fuel cell is disposed below the hydrogen sensor (see, for example, Japanese Unexamined Patent Application, First Publication No. 2003-252252).

However, in the case of such a conventional fuel cell vehicle, the fuel cell stack is disposed under the floor panel over a wide area in the vehicle width direction, leading to problems such as a rise in the overall height of the floor panel and cramping of the seating space of the occupants.

Also, stacking the unit fuel cells in the vehicle body longitudinal direction has been investigated in such a fuel cell vehicle. However, in this case reliably protecting the fuel cell stack against a load applied from a side of the vehicle perpendicular to the stacking direction of the fuel cell stack becomes an issue. Similarly to the fuel cell stack, it is also an issue to dispose in the vehicle auxiliary components of the fuel cell such as a heater for cold starting and a voltage converter so as to reliably protect them against loads applied from outside the vehicle.

Moreover, while measures for endurance have been implemented such as housing the hydrogen sensor in a hydrogen-permeable case that prevents water, mud or the like from splashing onto the hydrogen sensor while allowing natural ventilation of the fuel cell under the floor panel, improvements are sought for cost reduction.

In addition, the aforementioned related art has routed under the floor panel both a high voltage line that extends from the fuel cell stack to high voltage components such as the drive motor of the vehicle, and a low voltage line that extends to low voltage components such as solenoid valves and lamplights. Since such an arrangement raises the possibility of noise from the high voltage line influencing the low voltage line, improvements have been sought in that regard.

Also, the center console that forms the center tunnel abuts the dash lower positioned between the vehicle cabin and the motor room to the front thereof to increase rigidity of the vehicle body and simplify the structure thereof. In this case, because the inside of the center tunnel and the inside of the motor room are continuous, it becomes necessary to dispose a hydrogen sensor in the motor room to detect hydrogen that flows into the motor room via the center tunnel in addition to disposing a hydrogen sensor on the inside upper portion of the center tunnel to detect hydrogen below the floor panel. Improvements in this regard are therefore also sought to reduce the cost of parts.

The aforementioned art inhibits effects on the hydrogen sensor due to water, mud or the like splashed up from a road surface. However, in addition to the hydrogen sensor, it would be preferable to also inhibit the effect due to such splashing from the road surface onto the hydrogen system components and electrical system components. By doing so, the measures for endurance for such components could be scaled down to achieve a cost reduction.

Meanwhile, a constitution has been proposed of mounting the fuel cell stack and the components thereof on a sub-frame and then attaching this sub-frame to the bottom of the floor panel of the vehicle. However, even for such a constitution it is desired to be able to reduce the measures for endurance for the hydrogen system components and electrical system components.

SUMMARY OF THE INVENTION

The present invention was made in view of these circumstances and has as its object to provide a fuel cell vehicle that can reliably protect the fuel cell stack and fuel cell components against a load applied from outside without impairing comfort inside the cabin by raising the overall height of the floor panel and cramping the seating space in the cabin.

Another object of the present invention is to provide a fuel cell vehicle structure that can reduce measures for endurance for the hydrogen sensor under a condition that the fuel cell region is naturally ventilated.

Still another object of the present invention is to provide a fuel cell vehicle structure that can inhibit the influence of noise from a high voltage line on a low voltage line installed with the high voltage line.

A further object of the present invention is to provide a fuel cell vehicle structure that can eliminate the hydrogen sensor from the motor room even when the fuel cell is disposed under the floor panel to simplify the vehicle body structure.

A still further object of the present invention is to provide a fuel cell vehicle structure that can inhibit effects due to splashing up from a road surface onto the fuel cell stack and components thereof on the sub-frame attached to the bottom of the floor panel of the vehicle.

A first aspect of the present invention is a fuel cell vehicle including: a vehicle body; a floor panel provided on the bottom of the vehicle body; a floor tunnel that is formed bulging upward in the center of the floor panel in the vehicle body width; a pair of front seats that are disposed on the floor panel, outside of the floor tunnel in the vehicle body width direction; center frames that support the floor tunnel, disposed at the center in the vehicle body width and extending along the vehicle body longitudinal direction; a sub-frame provided on the bottom of the floor panel and joined to the center frames; and a fuel cell stack mounted on the sub-frame and provided under the floor tunnel.

The fuel cell vehicle of the present invention may further include side frames disposed along the vehicle body longitudinal direction at positions to the outside of each of the center frames in the vehicle body width, wherein the sub-frame is joined to the center frames and the side frames.

The fuel cell vehicle of the present invention may further include an auxiliary component of the fuel cell stack provided between one of the center frames and one of the side frames.

The fuel cell vehicle of the present invention may further include a connecting member that connects the fuel cell stack and the auxiliary component, wherein a recess is provided in at least one of the center frames and the sub-frame, and wherein the connecting member is disposed so as to pass through the recess.

The auxiliary component may be provided below the front seats.

The fuel cell vehicle of the present invention may further include a partitioning member which blocks a communicative passage between the floor tunnel and a space at the front of the vehicle body, being provided under the floor tunnel.

The top of the floor tunnel may have an inclined portion that is formed to become lower toward the front of the vehicle body, and the partitioning member may be provided under the inclined portion.

The fuel cell vehicle of the present invention may further include a hydrogen supply portion that supplies hydrogen to the fuel cell stack, being provided under the floor tunnel and at the rear of the fuel cell stack.

The fuel cell vehicle of the present invention may further include a hydrogen sensor provided in the floor tunnel and above the hydrogen supply portion.

The floor tunnel may be formed so that the upper portion under which the hydrogen sensor is disposed is the highest portion.

The fuel cell vehicle of the present invention may further include an air discharge portion provided under the floor tunnel and below the hydrogen supply portion.

The fuel cell vehicle of the present invention may further include an electrical control portion provided under the floor tunnel and above the hydrogen supply portion.

The fuel cell vehicle of the present invention may further include an electromagnetic shield member provided on the periphery of the fuel cell stack; a high-voltage line disposed on a first side that is outside of the fuel cell stack in the width direction; and a low-voltage line disposed on a second side being on an opposite side of the first side.

A second aspect of the present invention is a fuel cell vehicle including: a vehicle body; a floor panel provided on the bottom of the vehicle body; a floor tunnel that is formed bulging upward in the center of the floor panel in the vehicle body width; a fuel cell stack provided under the floor tunnel; and a hydrogen supply portion that supplies hydrogen to the fuel cell stack, being provided under the floor tunnel and at the rear of the fuel cell stack.

DETAILED DESCRIPTION OF THE INVENTION

Figure 1:
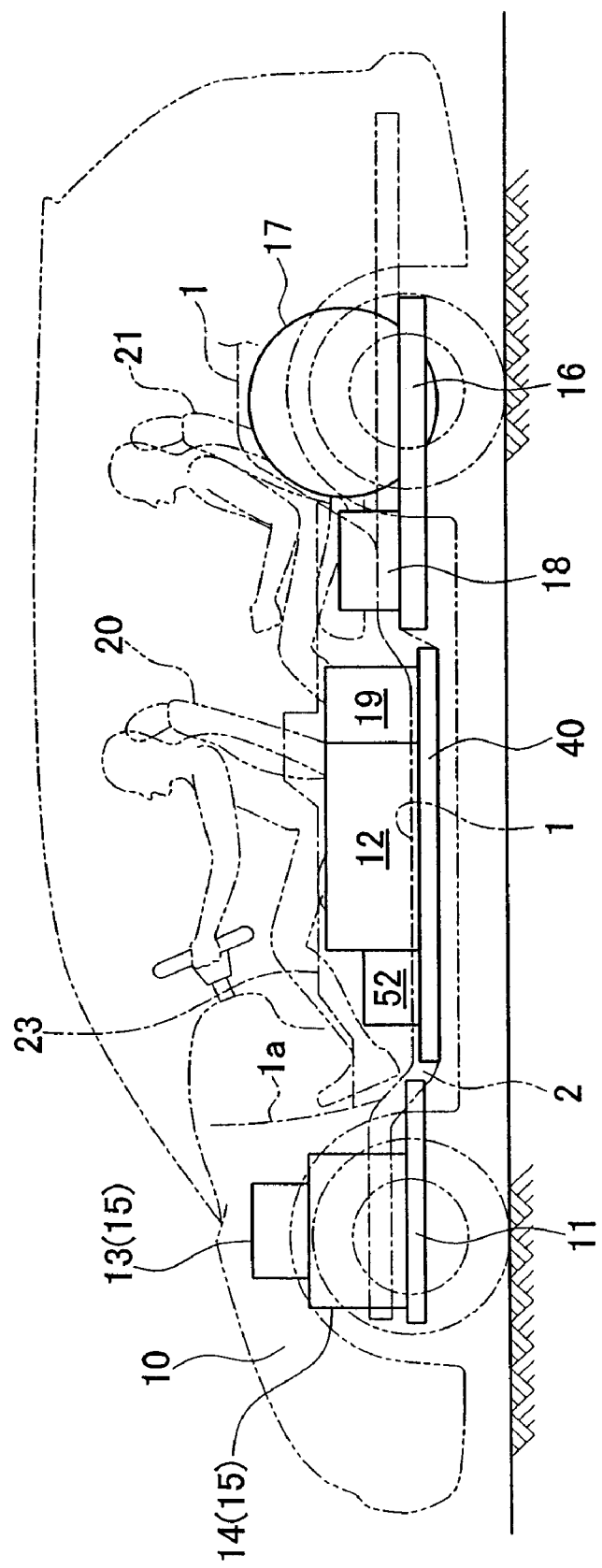
FIG. 1 is a side view of the vehicle according to the first embodiment of the present invention.
Figure 2:
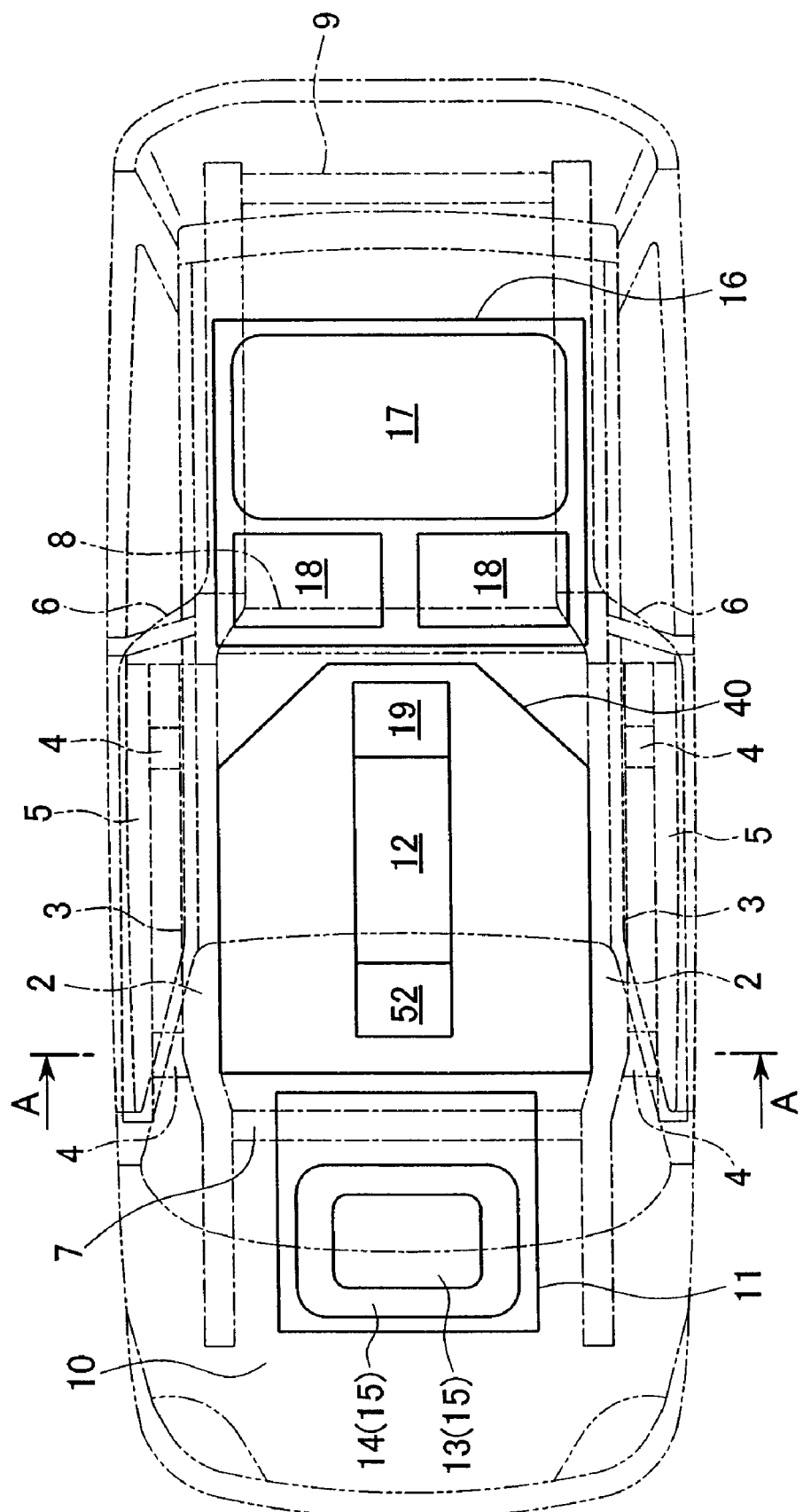
FIG. 2 is a plan view of the vehicle according to the first embodiment.
Figure 3:
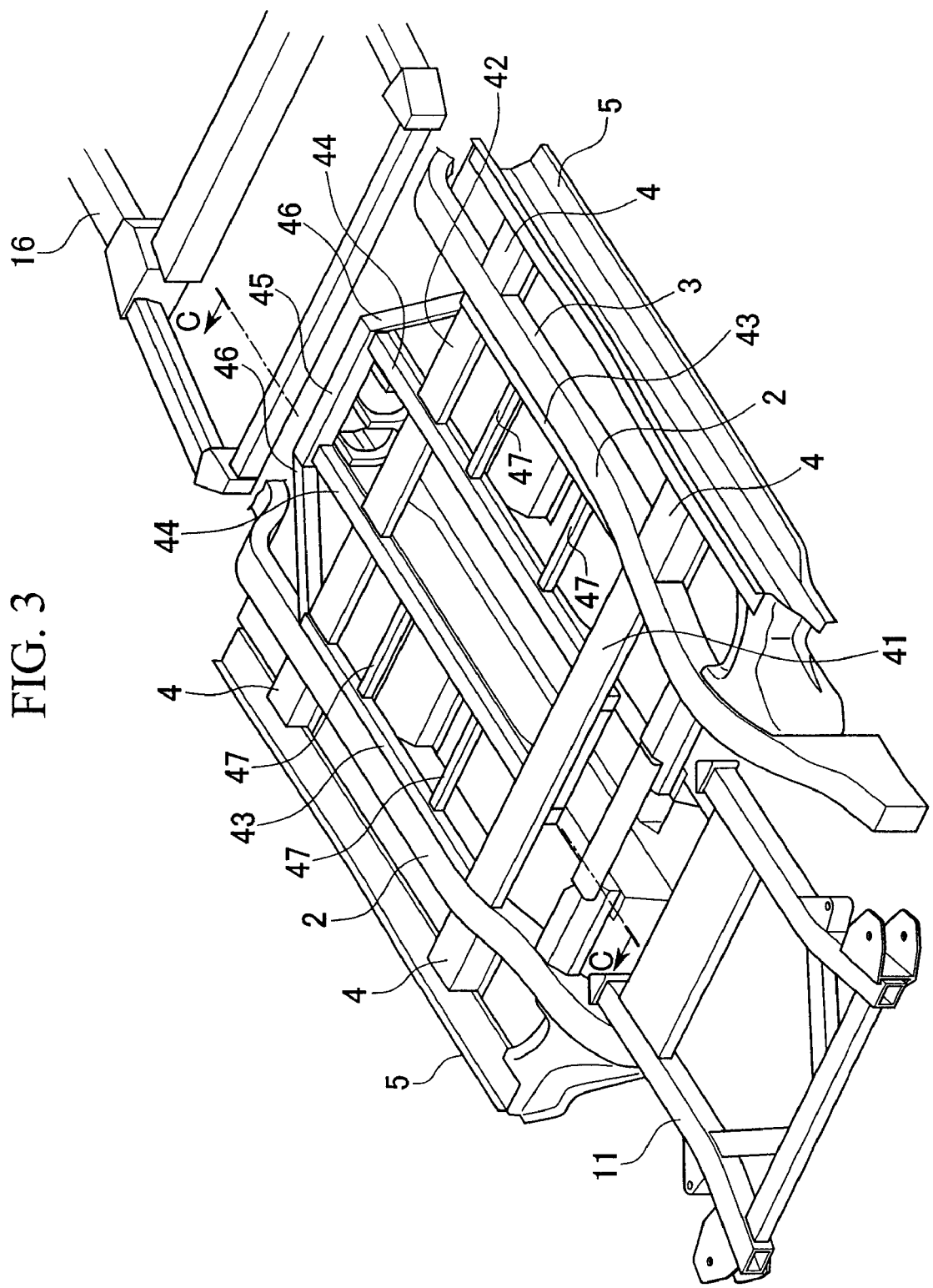
FIG. 3 is a perspective view from the under side of the vehicle according to the first embodiment.

A first embodiment of the present invention shall be described below with reference to the accompanying drawings.

As shown in FIGS. 1 to 4, provided in the fuel cell vehicle are a pair of left and right side frames 2 forming the vehicle body skeleton member under a floor panel 1 from the vehicle body front portion to the vehicle body rear portion. A side sill 5 is joined via outriggers 4 to an outside wall 3 of each of the side frames 2. The rear end portion of each side sill 5 is connected so as to merge with the rear portion of the side frame 2 via an extension 6. Cross members 7, 8, and 9 that are the vehicle body skeleton members in the vehicle body width direction are coupled to the side frames 2.

A front sub-frame 11 is provided in a motor room 10 at the vehicle body front portion, and here is provided a pump motor unit 15 which includes a compressor 13 that feeds air to a fuel cell stack 12 and a drive motor 14 for traction.

A rear sub-frame 16 which is integrally equipped with wheels and a suspension which are not illustrated is attached to the side frames 2 from below at the vehicle body rear portion. A hydrogen tank 17 that stores hydrogen, which serves as the fuel of the fuel cell stack 12, and a storage battery 18 are attached to the rear sub-frame 16.

The floor panel 1 is joined to regions between the side sills 5 on the side frames 2 thus constituted. The front end portion of the floor panel 1 continues into a dash lower 1a rising up at the front side, and the rear end portion of the floor panel 1 extends until a position covering the top portion of the hydrogen tank 17 on the rear sub-frame 16.

Front seats 20 and a rear seat 21 are disposed on the floor panel 1. A floor tunnel 23 that extends from the lower end portion of the dash lower 1a to the vicinity of the rear seat 21 is formed in the floor panel 1 between the left and right front seats 20 so as to bulge upward into the vehicle cabin.

Figure 4:
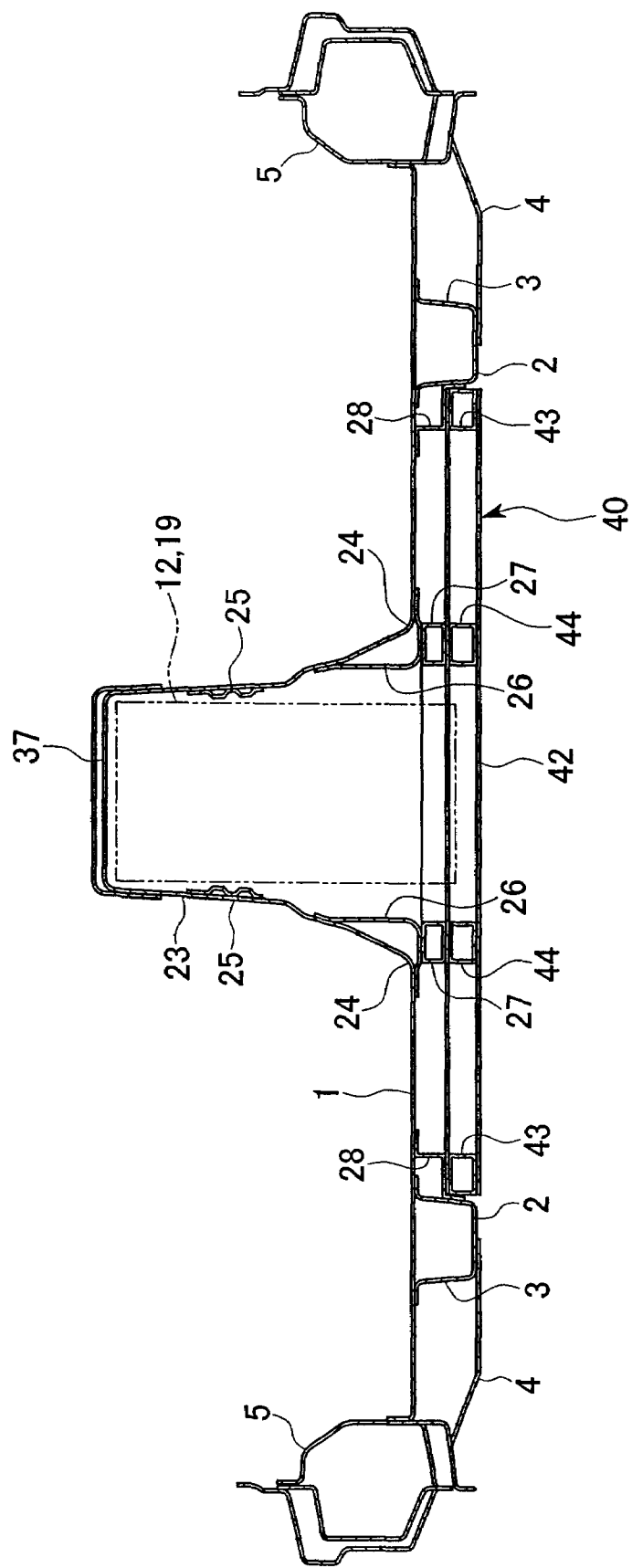
FIG. 4 is a cross-sectional view of the floor panel along line A-A in FIG. 2.

As shown in FIG. 4, at rising portions 24 on the base side of left and right side walls 25 of the floor tunnel 23, reinforcements 26 are joined from the undersurface side so as to form a triangular cross section. Thereby, the lower ends of the side walls 25 of the floor tunnel 23 are reinforced. In the center position in the vehicle body width direction, a pair of center frames 27 having a closed sectional structure are provided in a manner extending in the vehicle body longitudinal direction. The bottom ends of the side walls 25 are disposed above the center frames 27. The floor tunnel 23 is supported by joining the reinforcements 26 to the upper surface of center frames 27.

A reinforcement frame 28 with a closed cross sectional structure along the vehicle body longitudinal direction is joined to inside corner portions formed by the left and right side frames 2 positioned to the outside of the center frames 27 on both sides in the vehicle width direction and the floor panel 1 coupled to the top surfaces thereof. A sub-frame 40 described below is joined to the bottom of the reinforcement frames 28 integrated to the left and right side frames 2 and the center frames 27. The fuel cell stack 12 and auxiliary components 19 mounted on the sub-frame 40 are disposed within the floor tunnel 23.

Figure 5:
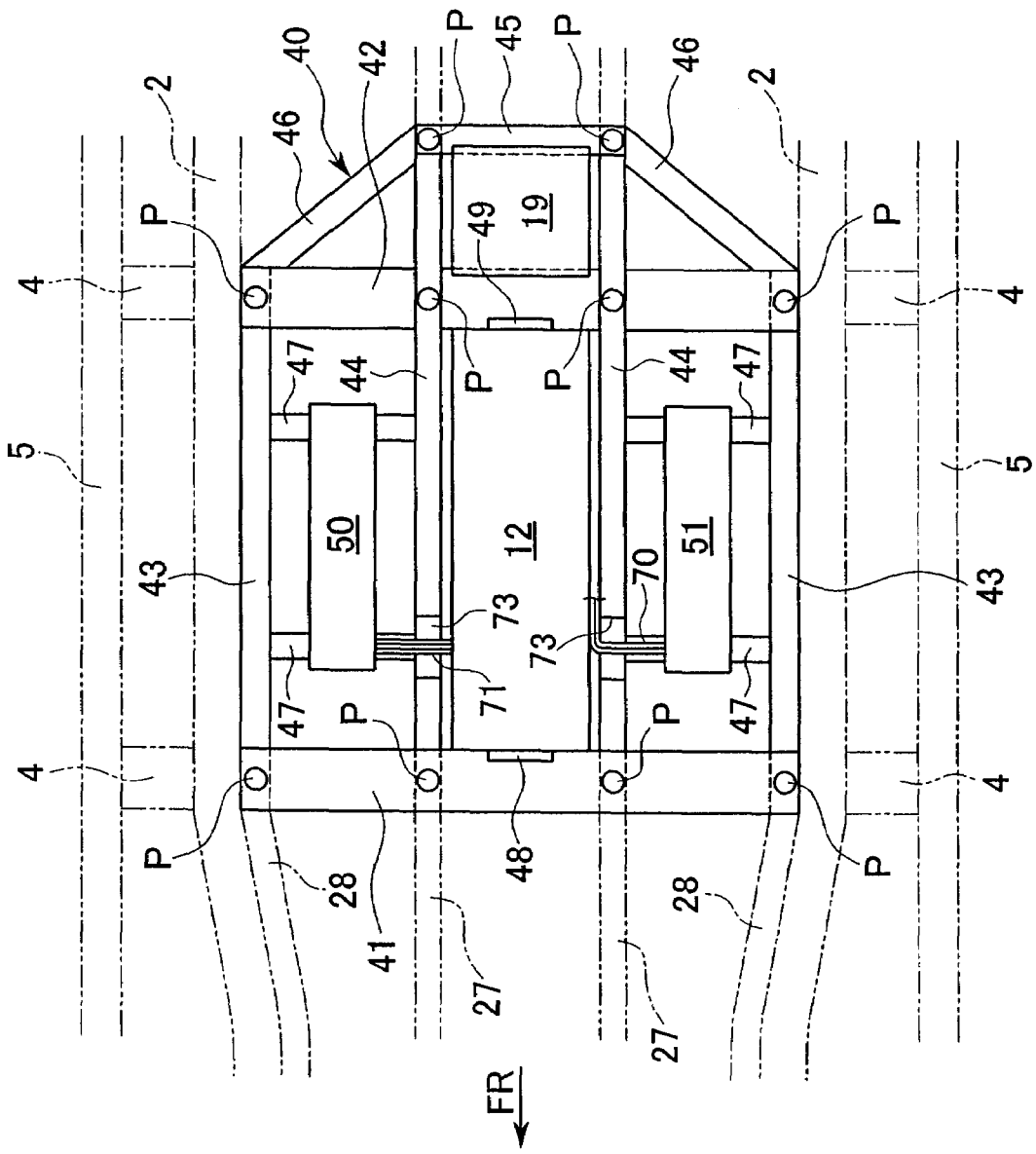
FIG. 5 is a plan view of the sub-frame of the first embodiment.

As shown in FIG. 5, the sub-frame 40 is provided with a front sub-cross frame 41 and a rear sub-cross frame 42 that are disposed at positions corresponding to the outriggers 4 and extend in the vehicle width direction. Provided between the front and rear sub-cross frames 41 and 42 are sub-side frames 43 that connect to the right and left end portions of the sub-cross frames 41 and 42. These sub-side frames 43 are disposed along the inside wall of the side frames 2 and under the reinforcement frames 28. In FIG. 5, reference symbol FR denotes the front.

Disposed to the inside of each sub-side frame 43 are sub-center frames 44 positioned under the center frame 27 along the longitudinal direction of the vehicle body. The front end portion of each sub-center frame 44 is joined to the front sub-cross frame 41, and the rear end portion of each sub-center frame 44 is joined to the rear sub-cross frame 42, with the sub-center frames 44 exceeding the joints with the sub-cross frame 42 to extend further to the rear. The rear end portions of the left and right sub-center frames 44 are linked by an end pipe 45 disposed in the vehicle width direction, and the left and right end portions of the end pipe 45 and the left and right end portions of the rear sub-cross frame 42 are joined by gusset pipes 46 that are obliquely disposed. The gusset pipes 46 are disposed so that when an impact load is input from a side against the outriggers 4, they deflect the impact load away from the fuel cell stack 12, thereby hindering the impact load at the time of a side impact from acting on the fuel cell stack 12.

Intermediate pipes 47 are connected at a specified interval at the front side and rear side between each sub-center frame 44 and sub-side frame 43.

Attachment points P for the reinforcement frames 28 of the vehicle body are set at the joint of the sub-side frames 43 and the sub-cross frames 41 and 42, attachment points P for the center frames 27 of the vehicle body are set at the joint of the sub-center frames 44 and the sub-cross frames 41 and 42, and at the joint of the end pipe 45, the gusset pipes 46, and the sub-center frames 44. The sub-frame 40 is fixedly fastened from below by bolts and nuts to the center frames 27 and the reinforcement frames 28 of the vehicle body at these 10 attachment points P, so as to be housed within the vertical width dimension of the side frames 2. Thus, since the sub-frame 40 is attached so as to be housed within the vertical width dimension of the side frames 2, the floor panel 1 can be lowered by the amount of the vertical width dimension of the sub-frame 40.

The fuel cell stack 12 is disposed between the front and rear sub-cross frames 41 and 42 of the sub-frame 40 so as to be housed between the left and right sub-center frames 44. The fuel cell stack 12 is fixed to the sub-frame 40 via brackets 48 and 49 (see FIGS. 6 and 7) that are fixed to the sub-cross frames 41 and 42. Also, the auxiliary components 19 of the fuel cell stack 12 are attached so as to be positioned between the sub-center frames 44 at the end pipe 45 and the rear sub-cross frame 42. Specifically, the auxiliary components 19 include oxygen system components, hydrogen system components, and an electronic control unit (ECU) that controls the system of the fuel cell stack 12, which are disposed in that order from the undersurface of the vehicle body.

The sub-frame 40 is constituted as described above, with the constituent elements such as the front and rear sub-cross frames 41 and 42, the left and right sub-center frames 44, and the end pipe 45 joined by bolt fastening or welding. In particular, when fastening the constituent elements by bolts, it is possible to adopt the joining structure as shown for example in FIGS. 8 and 9.

Figure 8:
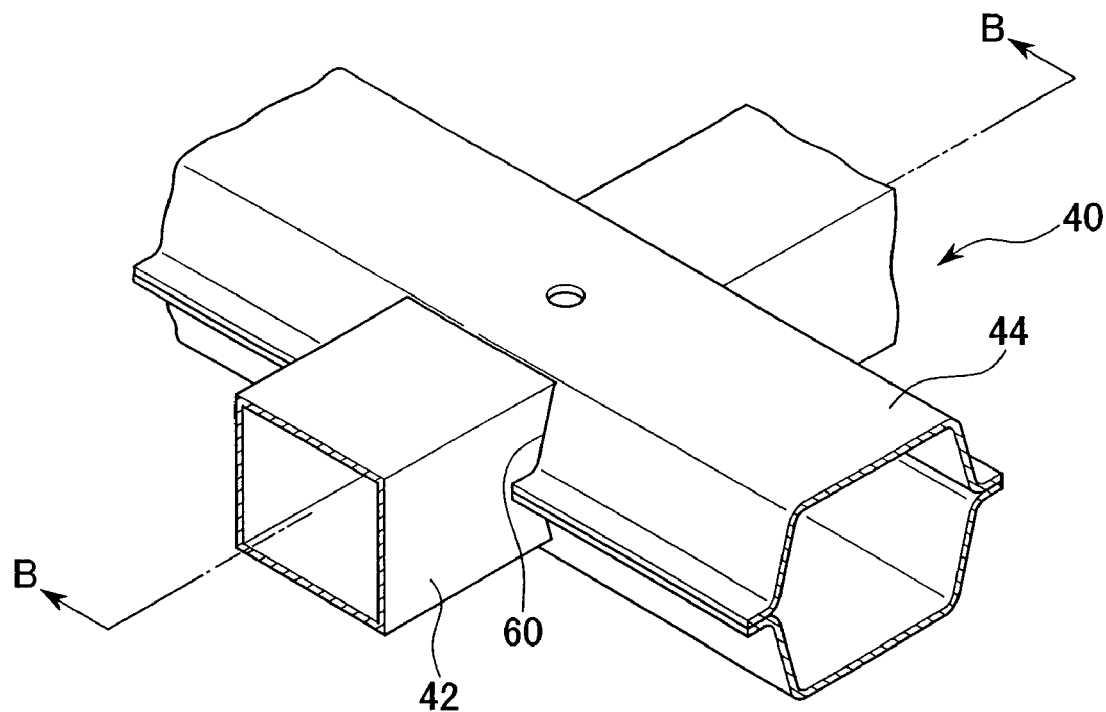
FIG. 8 is a partially broken perspective view of the joining structure of the sub-frame of the first embodiment.
Figure 9:
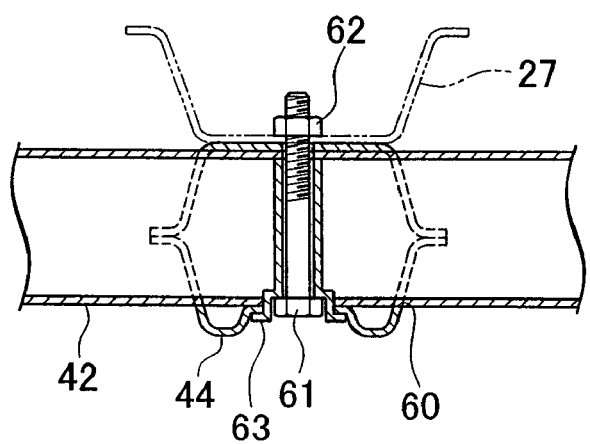
FIG. 9 is a cross-sectional view taken along the line B-B in FIG. 8.

FIGS. 8 and 9 show an example of a joining structure between one sub-center frame 44 and the rear sub-cross frame 42. At the joining structure, a through-hole 60 that penetrates in the vehicle width direction is formed in the sub-center frame 44, and the rear sub-cross frame 42 is fit into the through-hole 60. The schematic structure is achieved by joining both intersecting portions with a bolt 61 and a nut 62. In greater detail, as shown in FIG. 9, in the state of the sub-center frame 44 and the rear sub-cross frame 42 fit together, the bolt 61 is inserted from the bottom of the sub-center frame 44 into a reinforcement collar 63 that reaches the top wall of the rear sub-cross frame 42. In the state of the distal end of the bolt 61 inserted through the top walls of the rear sub-cross frame 42 and the sub-center frame 44 until passing through the center frame 27 on the vehicle body, the nut 62 is fastened thereon from the top side of the center frame 27. In the case of this structure, since the rear sub-cross frame 42 and the sub-center frame 44 are fit together in addition to joining the rear sub-cross frame 42 and the sub-center frame 44 by the bolt 61 and the nut 62, the strength and rigidity are further increased. Also, fixedly fastening together with the center frame 27 at the same time reduces the number of assembly steps.

Figure 6:
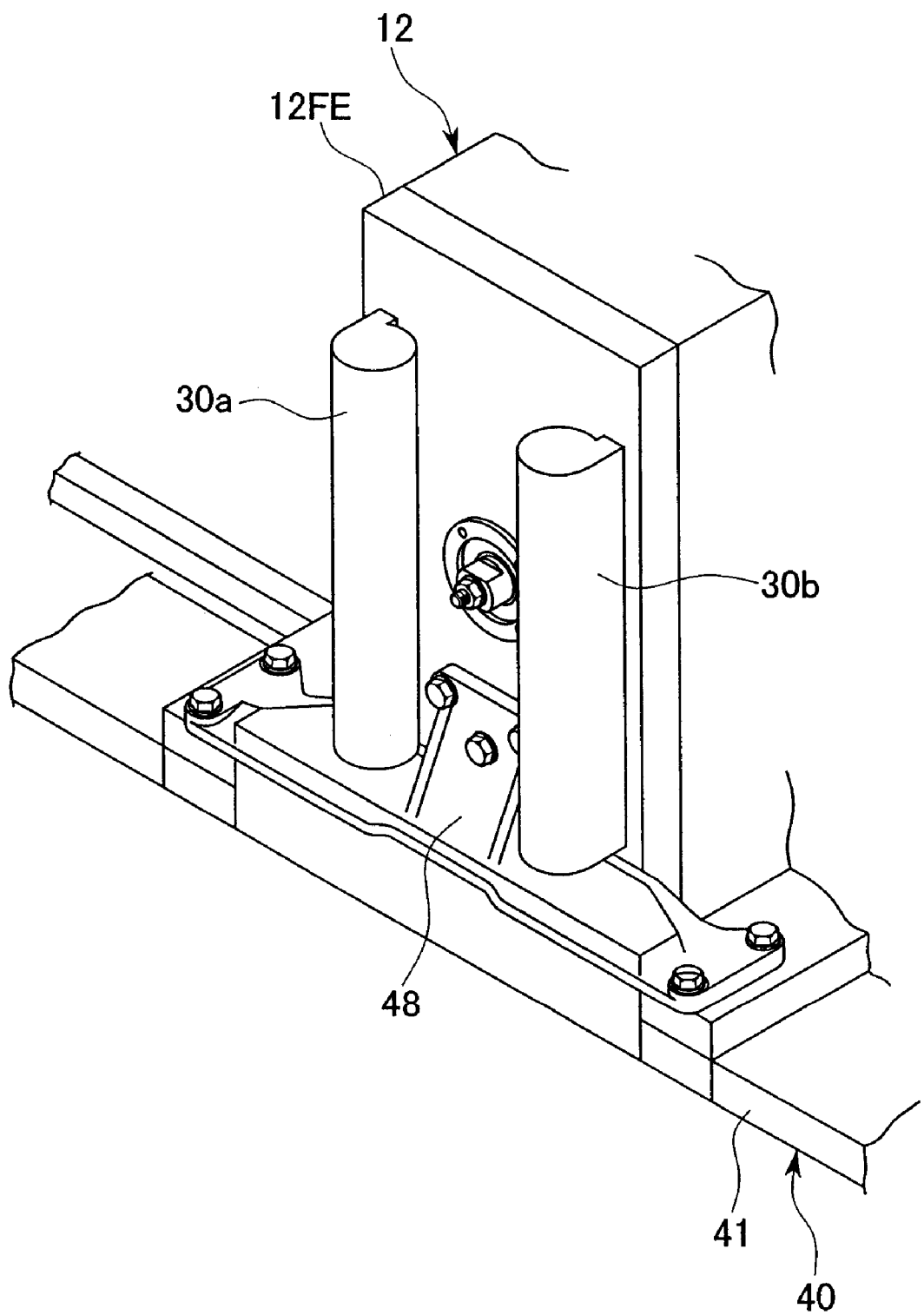
FIG. 6 is a perspective view showing the structure of the front portion of the fuel cell stack of the first embodiment.
Figure 7:
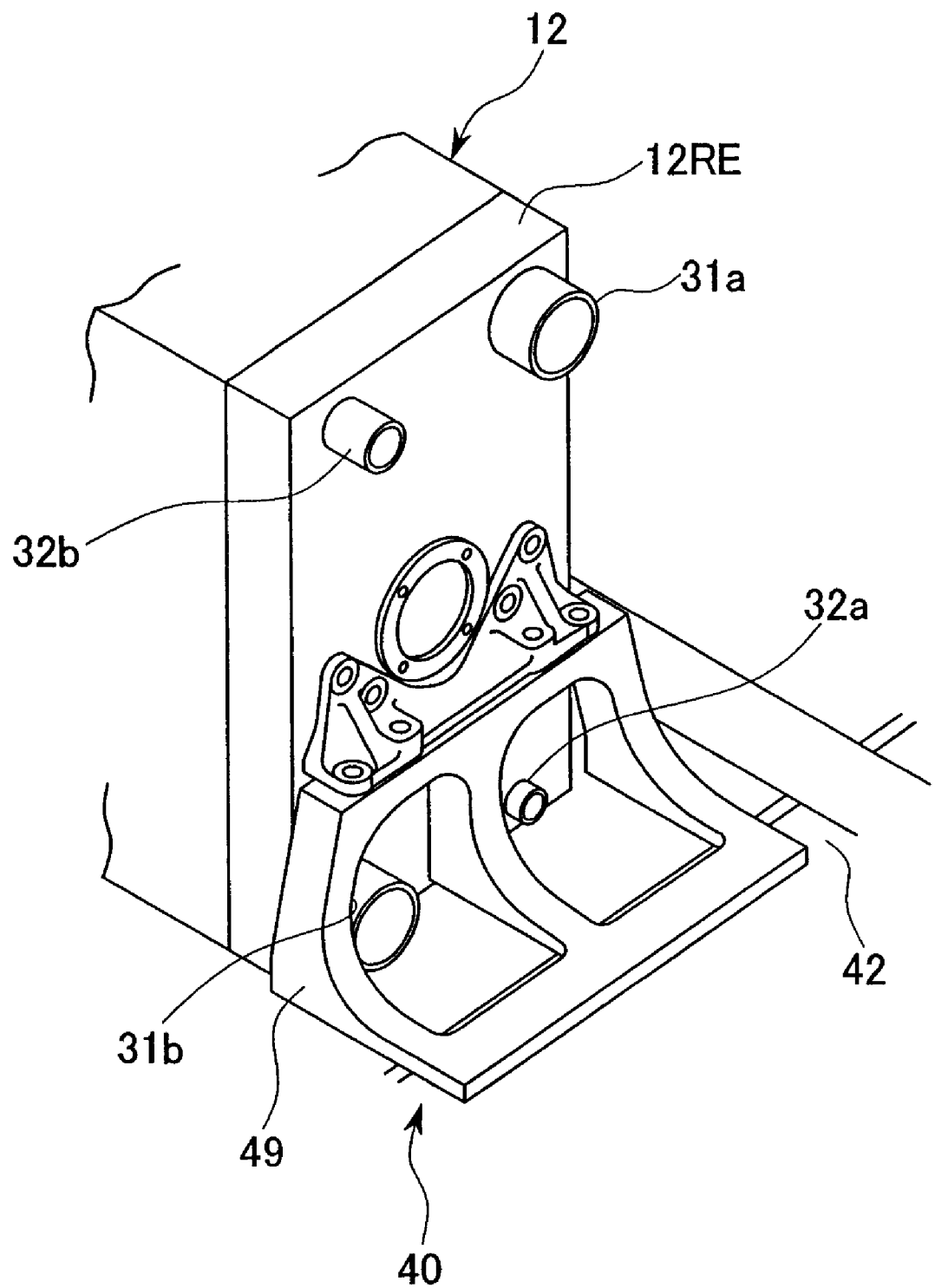
FIG. 7 is a perspective view showing the structure of the rear portion of the fuel cell stack of the first embodiment.

The fuel cell stack 12 is a single block formed by stacking a plurality of unit fuel cells (hereafter referred to as "unit cells") having a rectangular shape. Metal end plates 12FE and 12RE as shown in FIGS. 6 and 7 are attached at the front end portion and the rear end portion which are ends in the stacked direction, with the stacked unit cells sandwiched and fixedly fastened by these end plates 12FE and 12RE. The fuel cell stack 12 thus constituted is fixed to the sub-cross frames 41 and 42 via the brackets 48 and 49 as described above. At this time, the stack 12 is mounted to the sub-frame 40 with the long side of the rectangular shape of the unit cells oriented in the vertical direction. Accordingly, the height of the stack 12 is greater than the width thereof, and so in the state of the sub-frame 40 attached to the vehicle body undersurface as described above, the stack 12 can be housed within the narrow transverse cross section of the floor tunnel 23.

Also, as shown in FIG. 6, cooling water supply and discharge passages 30a and 30b are provided in the front end plate 12FE. As shown in FIG. 7, hydrogen supply and discharge outlets 31a and 31b (one being connected to the hydrogen tank 17) and oxygen supply and discharge outlets (one being connected to the compressor 13) are respectively provided at diagonal positions of the rear end plate 12RE.

Figure 10:
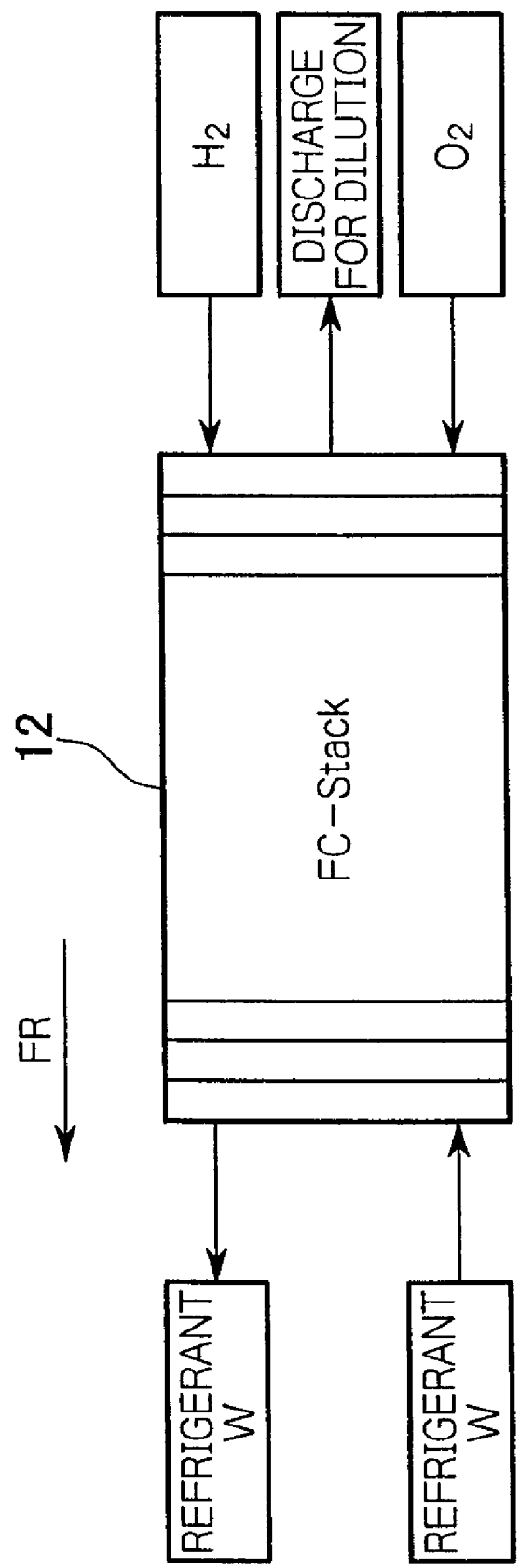
FIG. 10 is a schematic view of the fuel cell system of the first embodiment.

The system of the fuel cell mounted on this vehicle shall now be briefly explained. In the fuel cell, hydrogen and oxygen (i.e., the air pressurized by the compressor 13) are fed from the rear side of the fuel cell stack 12 as shown in FIG. 10. When the hydrogen and oxygen thus introduced are respectively supplied to the anode and cathode of each unit cell, electricity is generated by the reaction between both gases. Also, cooling water (refrigerant) is circulated from the front of the stack 12, and the heat generated during the reaction of the gases is cooled with the cooling water. The unreacted portion of hydrogen supplied to the anode of each cell is recycled by an ejector that is not shown. However, exhaust gas including residual hydrogen that is not completely reacted is diluted by a dilution box not shown and then discharged to outside the vehicle.

Also, as shown in FIG. 5, a DC-DC converter 51 is installed between the intermediate pipes 47 of the sub-frame 40 on the left side of the vehicle body, and a heater 50 that generates heat by burning hydrogen in the hydrogen tank 17 is installed between the intermediate pipes 47 on the right side of the vehicle body. The DC-DC converter 51 is an electrical component for voltage regulation, and a power conversion cable 70 thereof is arranged along the top of the intermediate pipe 47 and, crossing the opposing surfaces of the center frame 27 and the sub-center frame 44 on the vehicle body left side, is routed along the inside of the center frame 27 in the vehicle width direction.

Also, the heater 50 serves to supply warm water to the fuel cell stack 12 during a cold start, and a piping 71 thereof is arranged along the top of the intermediate pipe 47 and, crossing the opposing surfaces of the center frame 27 and the sub-center frame 44 on the vehicle body right side, is connected to the fuel cell stack 12.

The sub-center frames 44 and sub-side frames 43 that support the intermediate pipes 47 are attached along the center frames 27 and the side frames 2, respectively, of the vehicle body. Therefore, the DC-DC converter 51 and the heater 50 are disposed between the center frame 27 and the side frame 2 of the left and right sides of the vehicle, respectively. Also, the DC-DC converter 51 and the heater 50 are located under the left and right front seats 20 in the occupant space to sandwich the floor panel 1.

Figure 11:
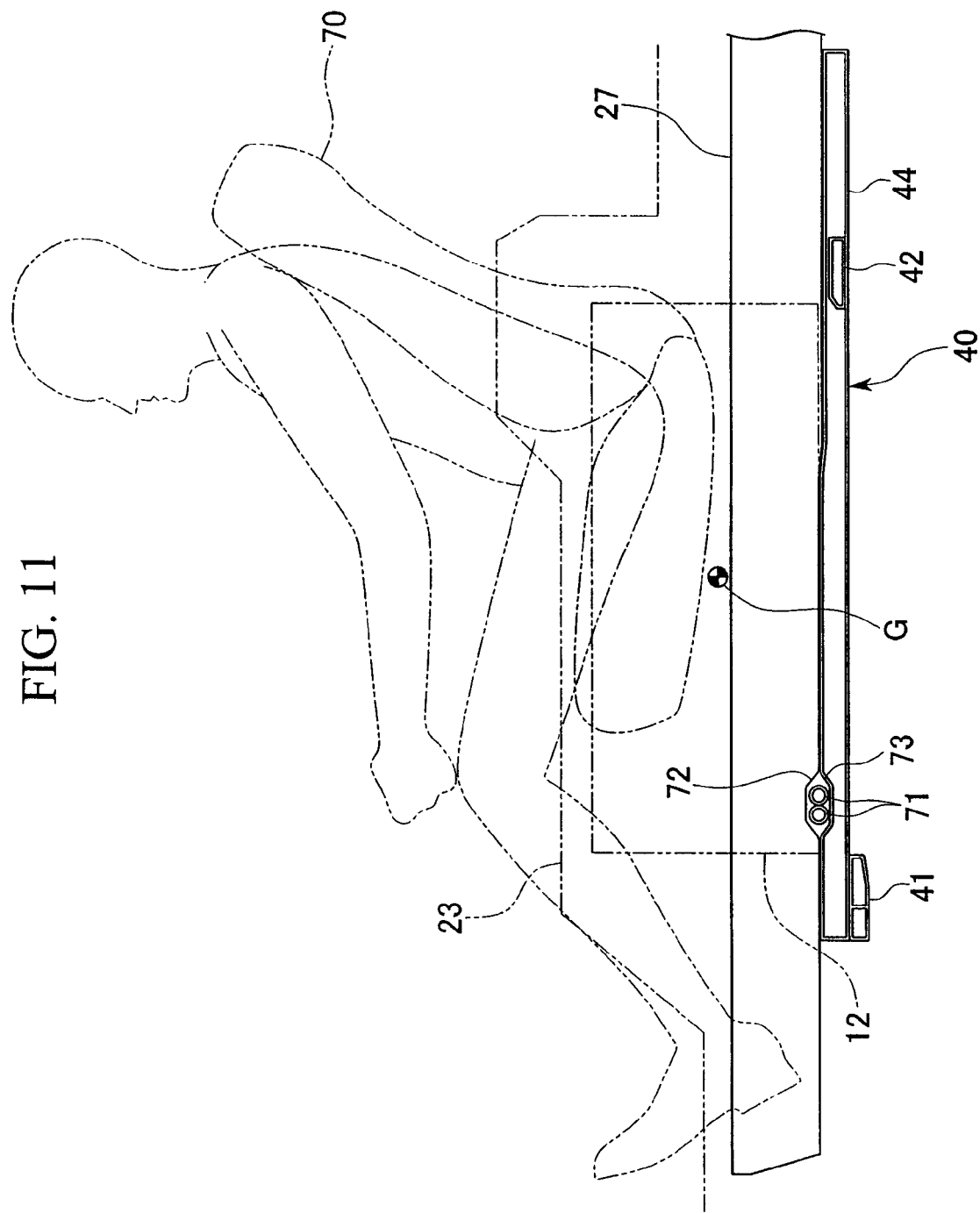
FIG. 11 is a cross-sectional view taken along the line C-C in FIG. 3.

As shown in FIGS. 5 and 11, mutually opposing indentations 72 and 73 are formed in the vertical opposing surfaces of the center frame 27 and the sub-center frame 44 on the right side of the vehicle body. The piping 71 of the heater 50 is inserted in the through-hole formed between the indentations 72 and 73. Similar indentations 72 and 73 are also formed in the opposing surfaces of the center frame 27 and the sub-center frame 44 on the left side of the vehicle body (only the indentation 73 on the side of the sub-center frame 44 is shown in FIG. 5). The power conversion cable 70 is inserted in the left through-hole between those indentations 72 and 73. In FIG. 11, reference symbol G denotes the center of gravity of the fuel cell stack 12.

The fuel cell stack 12 of this fuel cell vehicle is housed in the floor tunnel 23, which partially bulges upward between the left and right front seats 20 as observed above. Therefore, the stack 12 can be compactly disposed below the floor panel 1 to be outside of the occupant space while restricting a rise in the overall height of the floor panel 1 and without cramping the seating space in the occupant space. That is, only the floor tunnel 23 bulges significantly into the occupant space to allow placement of the stack 12, and, moreover, armrests and the like are disposed above the floor tunnel 23 so that the bulge into the occupant space does not inconvenience the occupants. Therefore, the bulge of the floor tunnel 23 does not impart a sense of oppression or discomfort to the occupants.

In particular, the center of gravity G of the stack 12 in this fuel cell vehicle is positioned above the level of the floor panel. Thereby, the stack 12 can be protected against loads that are input from a side of the vehicle, and the occupant space and the fuel cell stack 12 can be separated by the floor tunnel 23.

Moreover, in the present embodiment, housing the stack 12 in the floor tunnel 23 with its height greater than its width is advantageous for further reducing the width taken up by the floor tunnel 23 in the vehicle cabin space.

Also, in the case of this fuel cell vehicle, the sub-frame 40 supporting the fuel cell stack 12 is attached to the left and right side frames 2 and center frames 27 along the vehicle longitudinal direction below the floor panel 1. Thereby, the stack 12 can be supported with sufficient strength with respect to the vehicle body skeleton member. In particular, the outer sides of the sub-frame 40 in the vehicle width direction are joined to the side frames 2, whose cross section is advantageous in terms of its significant strength. The inner sides of the sub-frame 40 in the vehicle width direction are joined to the center frames 27 in the vicinity of the stack 12. Therefore, the stack 12 can be effectively protected against loads input from a side of the vehicle body perpendicular to the stacking direction of the stack 12.

Also, the sub-frame 40 can increase the strength in the bending direction of the center frames 27 supporting the bottom ends of the side walls of the floor tunnel 23. For that reason, deformation of the floor tunnel 23 and shifting of the fuel cell stack 12 when a load is input from the side can be effectively suppressed.

Since in this embodiment the fuel cell stack 12 is attached to a strong rectangular skeleton portion framed by the sub-cross frames 41 and 42 and the sub-center frames 44, the support stiffness for the stack 12 can be increased, and moreover the stack 12 can be more reliably protected against loads input from a side of the vehicle body.

In the embodiment, since the sub-frame 40 is joined to the center frames 27 at the intersections of the sub-center frames 44 and the sub-cross frames 41 and 42, the rigidity of the center frames 27 can be effectively increased by the aforementioned rectangular skeleton structure formed by the sub-cross frames 41 and 42 and the sub-center frames 44. Moreover, since the sub-cross frames 41 and 42 that support the fuel cell stack 12 are fastened to both the center frames 27 at the center in the vehicle width direction and the side frames 2 on the outside in the vehicle width direction, the stack 12 can be more reliably protected against a load input from a side of the vehicle body.

The present embodiment provides the gusset pipes 46 that obliquely couple both end portions of the rear sub-cross frame 42 and the sub-center frames 44 (both end portions of the end pipe 45) of the sub-frame 40. For that reason, an impact force that is input to the side frames 2 from a side of the vehicle body can be distributively transmitted to a plurality of points separated in the lengthwise direction of the center frames 27 via the sub-cross frames 41 and 42 and the gusset pipes 46. Accordingly, since the strength of the center frames 27 against a side load can be increased without causing an increase in the cross section of the center frames 27, the cross section of the center frames 27 can be downsized while ensuring sufficient vehicle body strength, and so both enhancement of the freedom of component placement and reduction in weight of the vehicle body can be achieved. In particular, since the gusset pipes 46 are obliquely coupled to the rear ends of the sub-cross frame 42 and portions of the sub-center frames 44 separated from the mounting location of the fuel cell stack 12 thereon so as to deflect an impact load from the side in a direction away from the stack 12, the stack 12 can be more effectively protected.

Moreover, since the heater 50 and the DC-DC converter 51, which are auxiliary components of the fuel cell, are disposed in the fuel cell vehicle between the center frames 27 and the side frames 2 via the sub-frame 40, the heater 50 and the DC-DC converter 51 can be reliably protected between the sub-frame 40 and the left and right center frames 27 even when a load is input against the vehicle from the outside. In particular, in the case of disposing the auxiliary components between the sub-frame 40 and the center frames 27 via the sub-frame 40 assembled with a plurality of frame members as in the present embodiment, the support portions of the heater 50 and the DC-DC converter 51 are rigid structures that hinder deformation, making the protection of both more reliable.

Also, in the present embodiment, the piping 71 between the heater 50 and the fuel cell stack 12 and the wiring (power conversion cable 70) drawn from the DC-DC converter 51 are arranged to pass through the indentations 72 and 73 formed in opposing faces of the center frames 27 and the sub-center frames 44 (sub-frame 40). Therefore, the piping 71 and the wiring can be effectively routed under the floor panel 1. Moreover, since the indentations 72 and 73 envelop the circumference of the piping 71 and the wiring (70), both can be reliably protected when a load is input from the outside.

Moreover, in the present embodiment, since the heater 50 and the DC-DC converter 51 are disposed below the front seats 20, when a load is input from a side of the vehicle body, the frames of the front seats 20 can more reliably prevent the input of the external force to the heater 50 and the DC-DC converter 51.

The present invention is not limited to the above preferred embodiment, with various modifications being possible without departing from the spirit or scope of the present invention. For example, in the above embodiment, both end portions of the sub-frame 40 in the vehicle width direction were joined to the side frames 2 via the reinforcement frame 28. However, the sub-frame 40 may be directly joined to the side frames 2. Also, the specific structure of the sub-frame 40 and the fuel cell components are not limited to those of the aforementioned embodiment, and may be embodied in various forms.

Also, the indentations 72 and 73 were formed in both opposing surfaces of the center frame 27 and the sub-center frame 44 in the aforementioned embodiment. However, if a single indentation can allow insertion of the piping or wiring of the auxiliary components, it may be formed in either one of the center frame 27 and the sub-center frame 44 only.

FIGS. 12 to 19 show a second embodiment of the invention.

The basic structure of the fuel cell vehicle of the present embodiment is substantially identical to the first embodiment, differing from the first embodiment by the attachment structure of brackets 148 and 149 for attaching the fuel cell stack 12 to a sub-frame 140 and the joining structure of the frame elements of the sub-frame 140. In the second embodiment explained here, elements identical to those in the first embodiment are identified with the same reference numerals, and overlapping descriptions shall be omitted.

Figure 12:
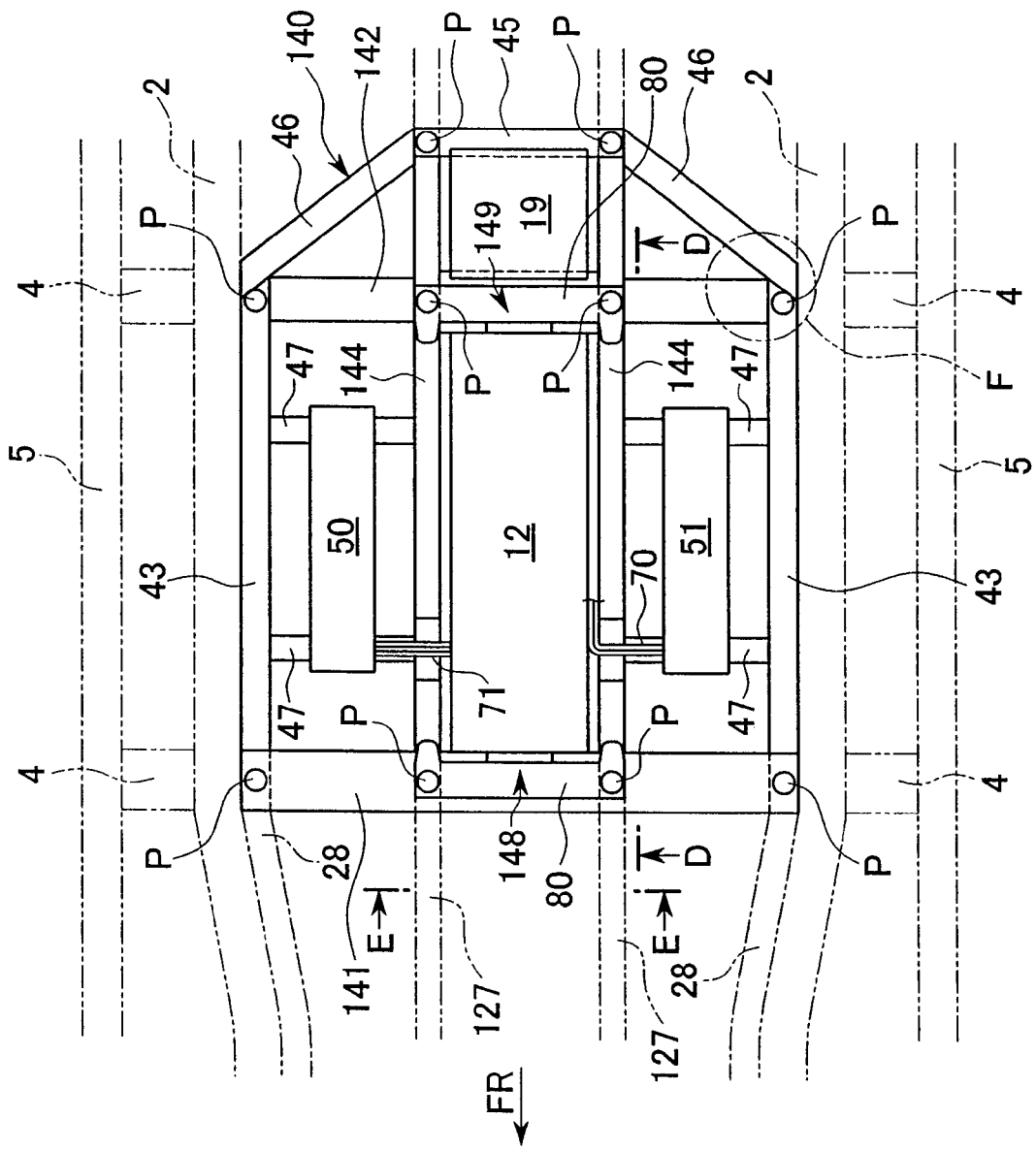
FIG. 12 is a plan view of the sub-frame of the second embodiment.
Figure 13:
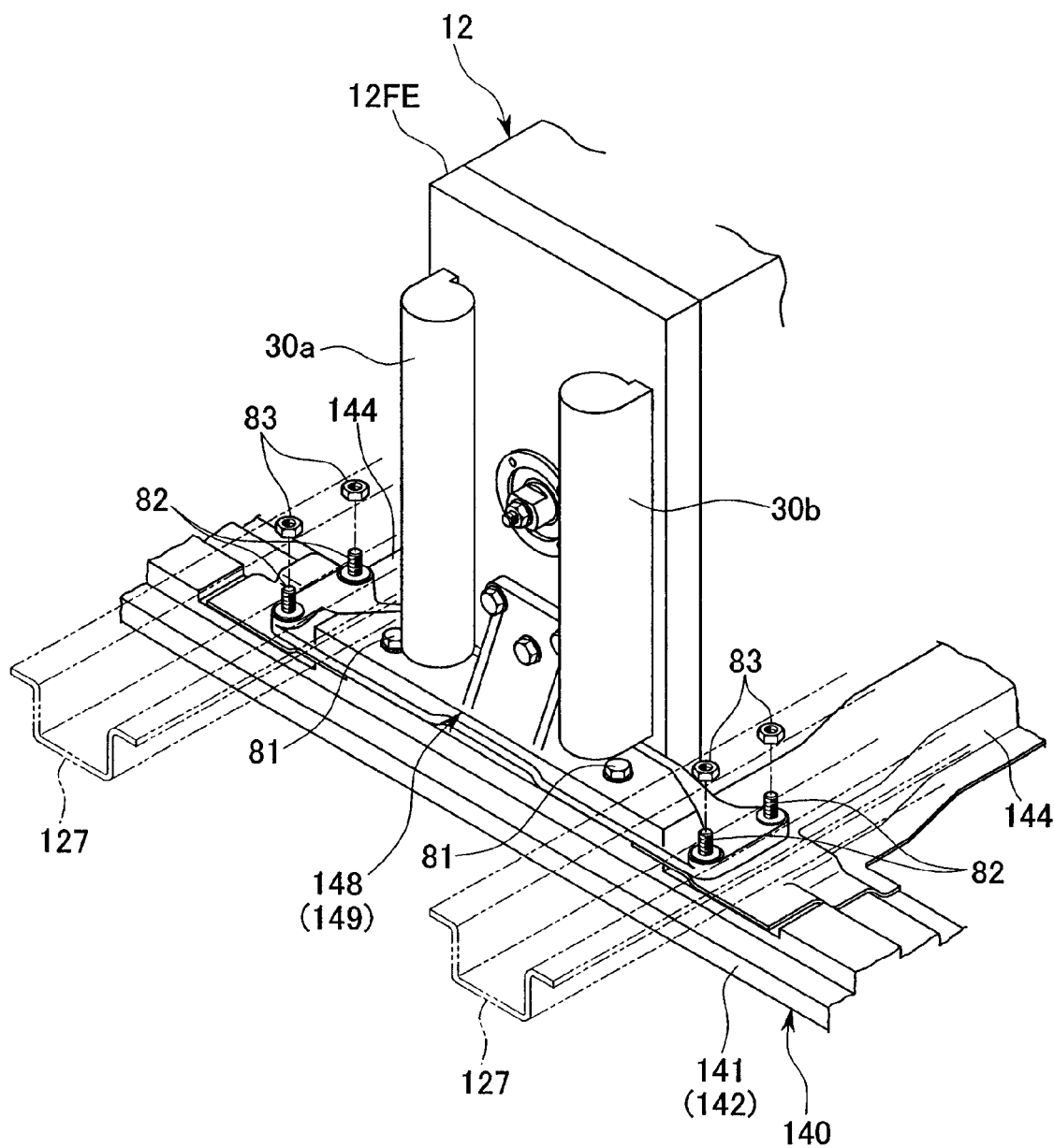
FIG. 13 is a perspective view showing the structure of the front portion of the fuel cell stack of the second embodiment.

The basic structure of the sub-frame 140 is nearly identical to the first embodiment. However, the brackets 148 and 149 for attaching the fuel cell stack 12 to the sub-frame 140 each have an attachment base portion 80 that is joined to the sub-frame 140 as shown in FIGS. 12 and 13. The attachment base portions 80 extend so as to straddle the left and right sub-center frames 144, covering the top surfaces of the sub-cross frames 141 and 142 and a portion of the sub-center frames 144. Each attachment base portion 80 of the brackets 148 and 149 is joined to the sub-cross frames 141 and 142 by a plurality of bolts 81 and 82. FIG. 13 shows the attachment structure of the bracket 148 provided on the front sub-cross frame 141, with the attachment structure of the bracket 149 provided on the rear sub-cross frame 142 not directly shown. However, the attachment structure of the bracket 149 has a nearly identical structure to the attachment structure of the bracket 148. Accordingly, the corresponding reference numerals for the attachment structure of the bracket 149 are added in parentheses.

Figure 14:
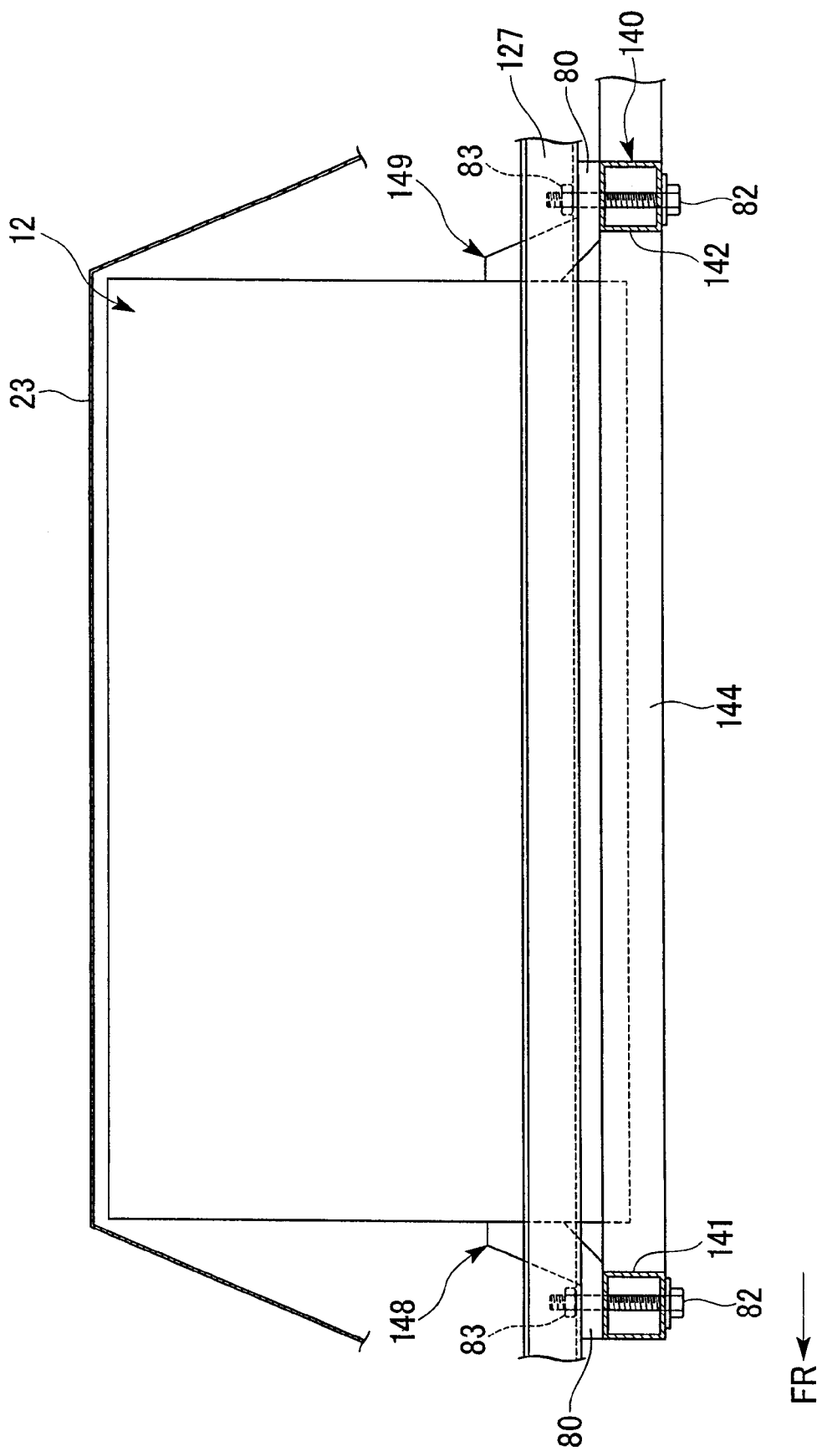
FIG. 14 is a cross-sectional view taken along the line D-D in FIG. 12.
Figure 15:
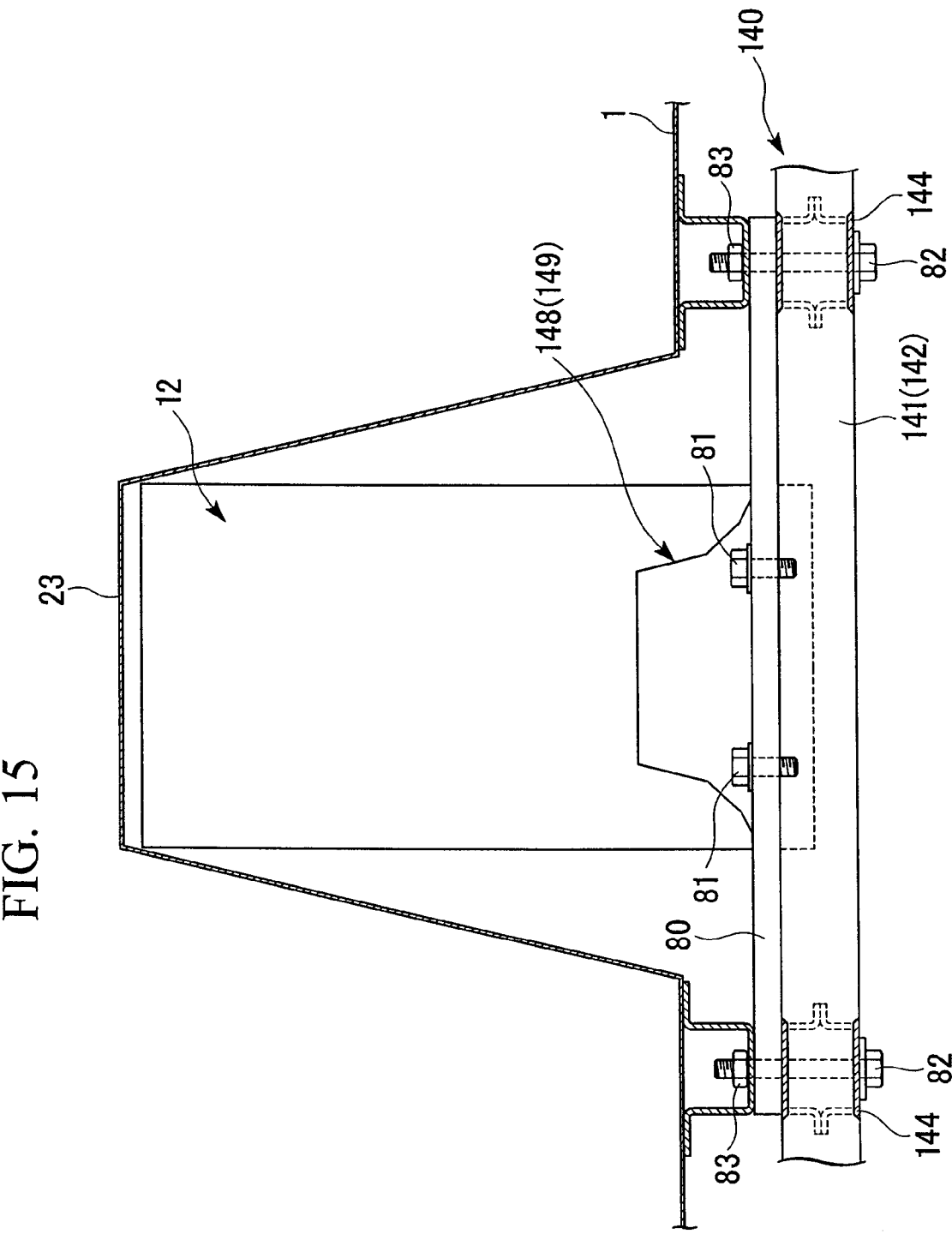
FIG. 15 is a cross-sectional view taken along the line E-E in FIG. 12.

The frame elements of the sub-frame 140 in the present embodiment are overlapped as described below, with the overlapped frame elements being suitably fixedly welded. The left and right sub-center frames 144 are overlapped by the top and bottom surfaces of the sub-cross frames 141 and 142, and each overlap portion is joined to a center frame 127, which is a vehicle body skeleton member, by bolts 82 and nuts 83. Thus, when the sub-frame 140 is joined to the center frames 127, the end portions of the brackets 148 and 149 become sandwiched between the sub-frame 140 and the center frames 127 as shown in FIGS. 14 and 15, and in this state are fixedly fastened by the bolts 82 and the nuts 83. The brackets 148 and 149 are independently joined to the sub-cross frames 141 and 142 by bolts 81 at positions to the inside of the left and right sub-center frames 144 in the width direction.

Also, in the case of the present embodiment, the frame elements of the sub-frame 140 are basically connected by welding. FIGS. 16 to 19 show an example of the joining structure of the sub-frame 140, with the joining portion of a sub-side frame 143, the rear sub-cross frame 142 and a gusset pipe 146 as well as the region thereof being depicted.

Figure 16:
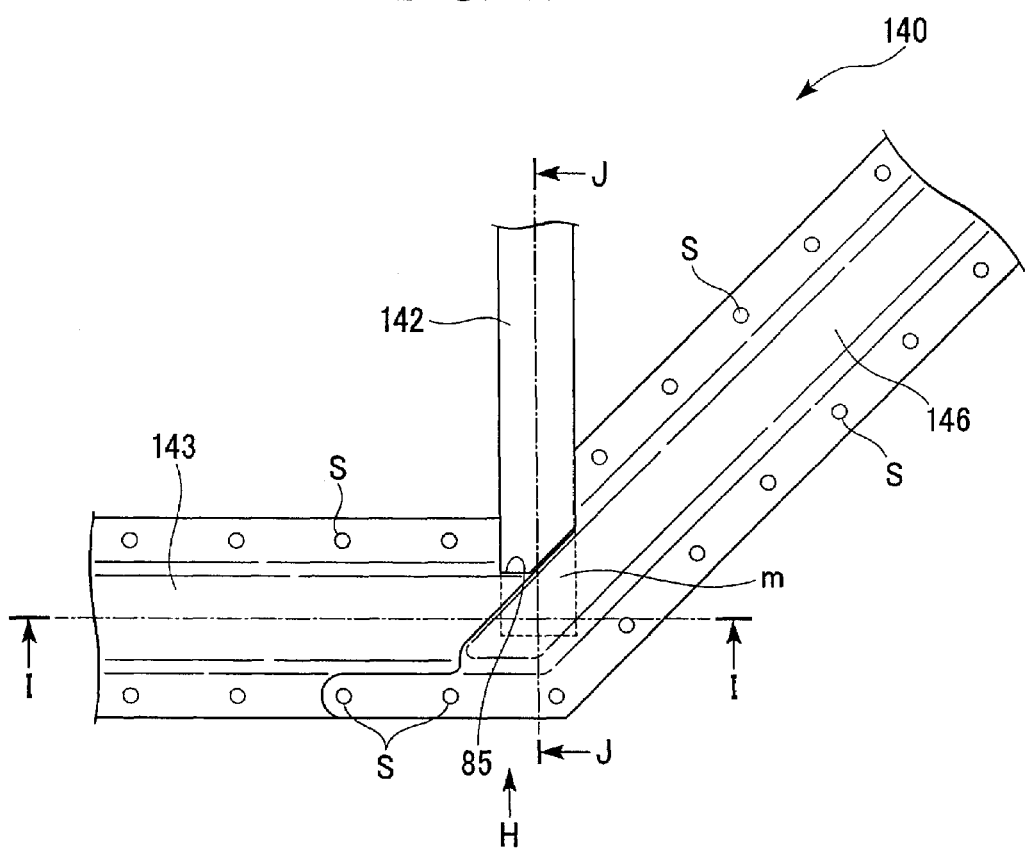
FIG. 16 is a magnified plan view of the portion F in FIG. 12.
Figure 17:
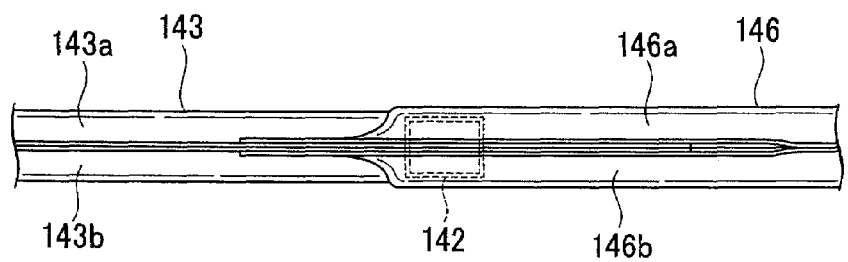
FIG. 17 is a view from arrow H in FIG. 16.
Figure 18:
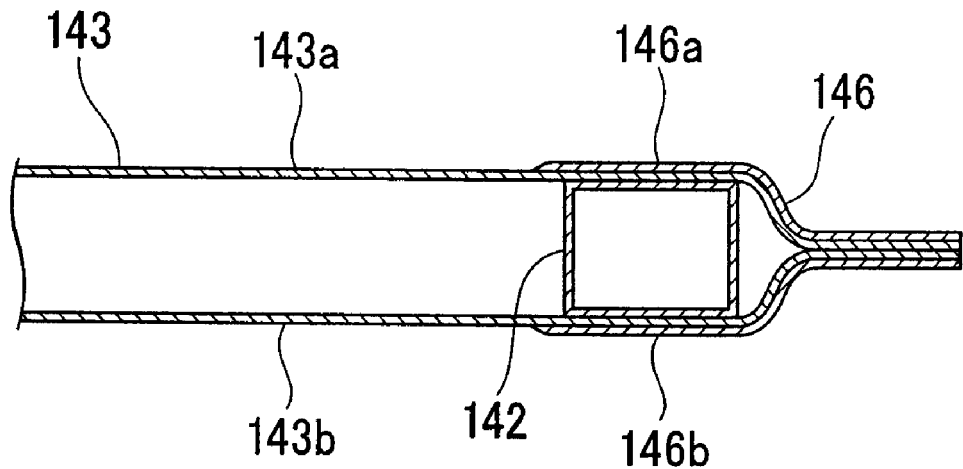
FIG. 18 is a cross-sectional view taken along the line I-I in FIG. 16.
Figure 19:
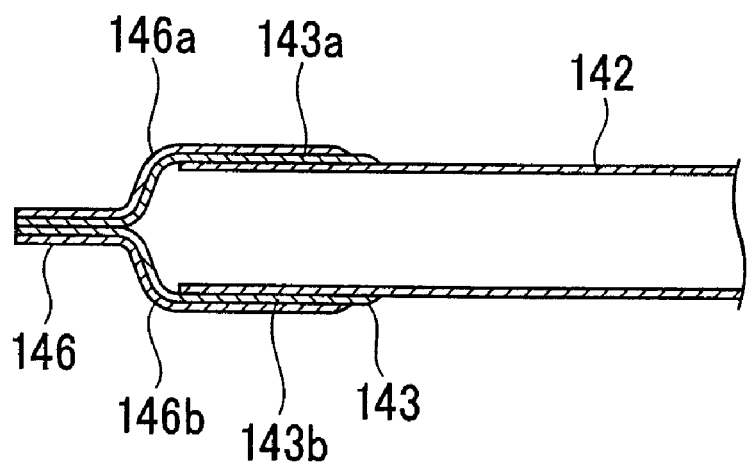
FIG. 19 is a cross-sectional view taken along the line J-J in FIG. 16.

The sub-side frame 143 and the gusset pipe 146 each have a basic structure in which flange portions of both edges of respective plates 143a, 143b and 146a, 146b having a hat-like cross section are spot welded to each other. At the joining portion of the sub-side frame 143 and the gusset pipe 146, the plates 146a, 146b of the gusset pipe 146 are overlapped by the outer surface of the plates 143a, 143b of the sub-side frame 143, and the flange portions of the four overlapped plates 143a, 143b, 146a, and 146b are simultaneously spot welded. At the joint of the sub-side frame 143 and the gusset pipe 146, a rectangular opening 85 is formed at the inside corner portion in the vehicle width direction. The end portion of the sub-cross frame 142 is inserted into this opening 85, and the sub-cross frame 142 is fixed to the sub-side frame 143 and the gusset pipe 146 by MIG welding. In FIG. 16, reference symbol S denotes spot welding, and reference symbol M denotes MIG welding.

The present embodiment provides the gusset pipes 146 that obliquely couple both end portions of the sub-cross frame 142 and the rear end portions of the sub-center frames 144 at the sub-frame 140 similarly to the first embodiment. For that reason, an impact load that is input from a side of the vehicle body can be distributively supported at a plurality of points separated in the lengthwise direction of the center frames 127.

Since the transmitted load can be distributed in a direction heading away from the fuel cell stack 12, the fuel cell stack 12 can be more effectively protected.

In the fuel cell vehicle of the present embodiment, the attachment bases 80 of the brackets 148 and 149 for attaching the fuel cell stack 12 to the sub-frame 140 are formed so as to straddle the tops of the sub-center frames 144. Also, both end portions of the attachment bases 80 are fastened by the bolts 82 and the nuts 83 to the center frames 127 so as to be sandwiched by the center frames 127 and the sub-frame 140. For that reason, the brackets 148 and 149 can be attached to the vehicle body with high rigidity, so that the center frames 127 can be reinforced by the brackets 148 and 149.

Accordingly, in the present embodiment, the rigidity of the center frames 127 can be effectively increased without causing an increase in the number of parts or a substantial increase in weight.

Also, it is possible to form the sub-frame 140 and the brackets 148 and 149 by a material of the same properties. However, they may also be formed by materials with different properties so as to be made to bear the support strength by means of suitable materials corresponding to their respective roles.

A third embodiment of the present invention shall now be described with reference to the drawings. In the following explanation, the orientations front, rear, right, and left, shall, unless specifically noted, be identical to orientations of the vehicle. Also, the arrow FR in the drawings indicates the front of the vehicle, the arrow LH the left side of the vehicle, and the arrow UP the top of the vehicle.

Figure 20:
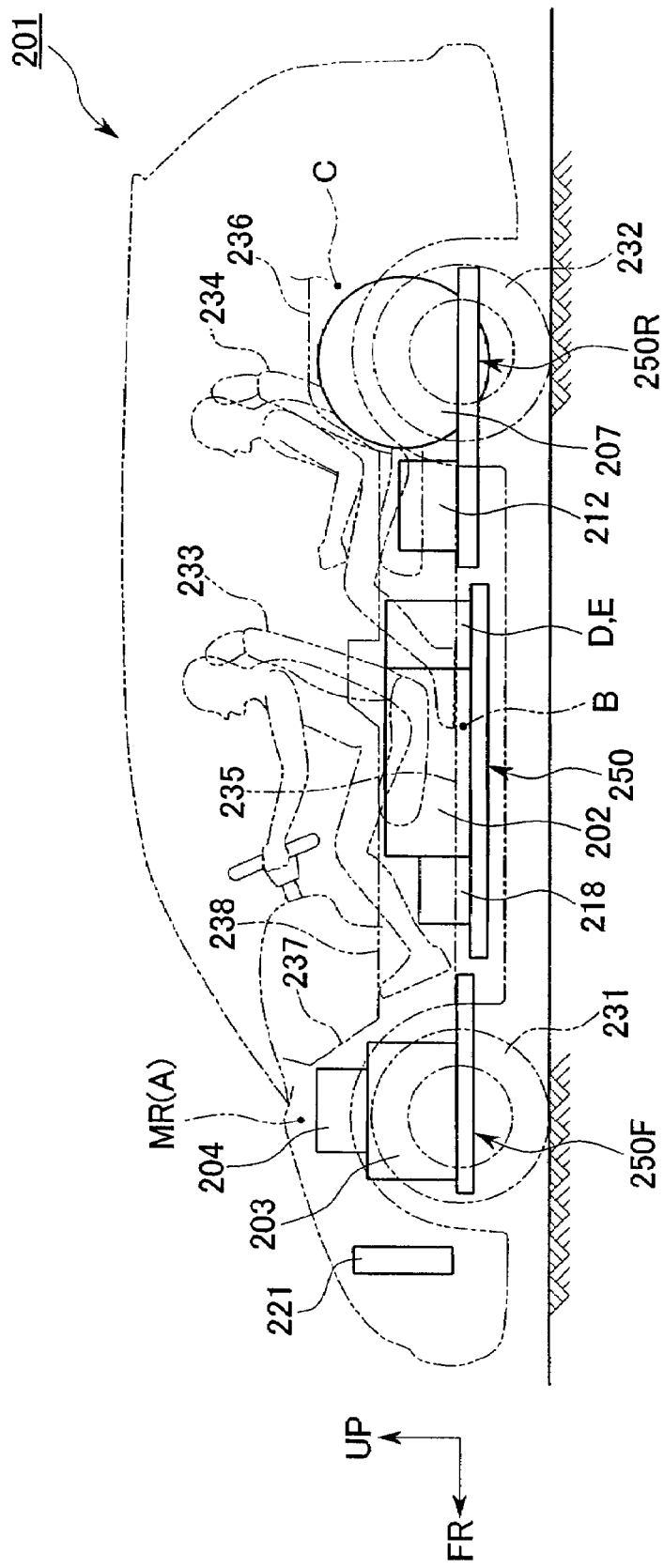
FIG. 20 is a side view of the fuel cell vehicle according to the third embodiment of the present invention.
Figure 21:
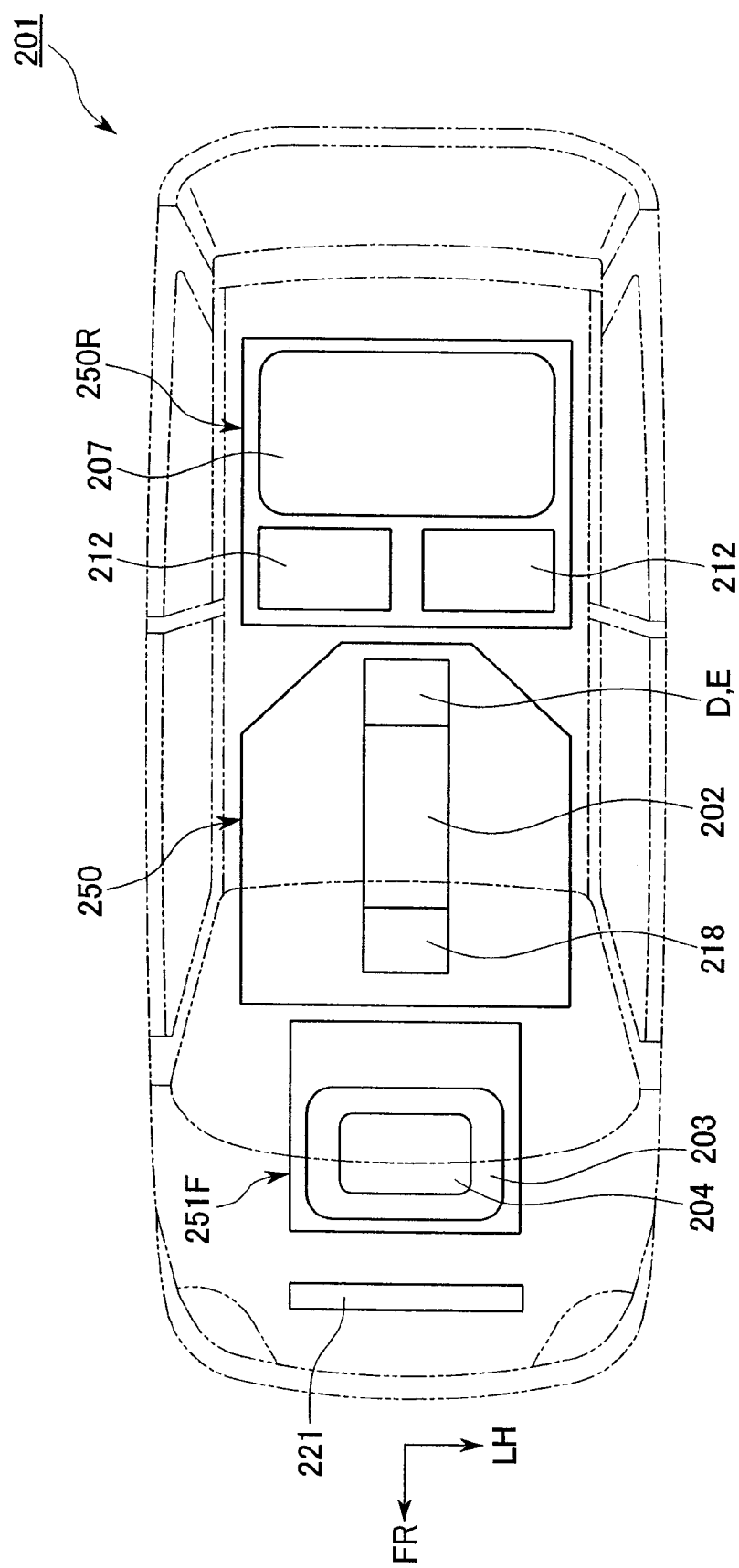
FIG. 21 is a plan view of the vehicle according to the third embodiment.

The fuel cell vehicle 201 shown in FIGS. 20 and 21 has mounted under the floor of the vehicle body a fuel cell stack 202 (hereinafter simply referred to as a fuel cell) that generates electricity by an electrochemical reaction between hydrogen and oxygen. The fuel cell vehicle travels by driving a drive motor 203 with electrical power generated by the fuel cell stack 202.

The fuel cell stack 202 is a well-known solid polymer electrolyte membrane fuel cell (PEMFC) formed by stacking a plurality of unit fuel cells (unit cells). Hydrogen gas is supplied to the anode side as fuel gas, and air including oxygen is supplied to the cathode side as oxidizing gas. Water is produced as a byproduct of generating electrical power by the electrochemical reaction.

Figure 22:
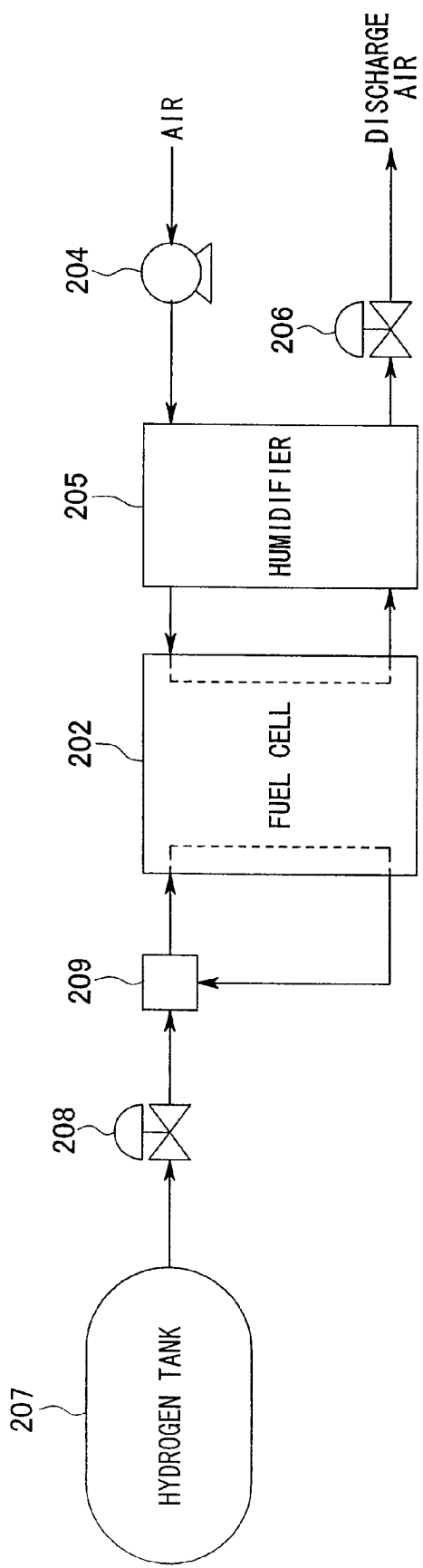
FIG. 22 is a schematic view of the structure of the fuel cell system in the third embodiment.

The outline of the fuel cell system in the fuel cell vehicle 201 is now explained referring to FIG. 22. First, air including oxygen is compressed by a compressor 204, humidified by a humidifier 205, and then supplied to the cathode of the fuel cell 202. After being supplied to electrical generation, it is discharged from the fuel cell stack 202 (only a unit fuel cell is shown in the drawing), and after passing through the humidifier 205 where it serves as a humidity source, is discharged via a pressure control valve 206. Meanwhile, the hydrogen gas in a hydrogen tank 207 is decompressed by a regulator 208 and supplied to the anode via an ejector 209. Left over hydrogen gas is discharged from the fuel cell 202 and drawn into the ejector 209. This hydrogen gas is mixed with fresh hydrogen gas supplied from the hydrogen tank 207 to be supplied again to the fuel cell 202. A portion of the hydrogen gas discharged from the fuel cell 202 is sent to a dilution box 211 (see FIG. 23), wherein it is diluted with reacted air discharged from the pressure control valve 206, and subsequently discharged.

The fuel cell stack 202 is disposed so that the stacking direction of the unit cells follows the vehicle longitudinal direction. It has a vertical layout in which the dimension in the longitudinal direction (vertical direction) is greater than the dimension in the lateral direction (horizontal direction) (see FIG. 27), which improves the drainage of water produced during electrical generation.

As shown again in FIGS. 20 and 21, a pair of batteries 212 having a rectangular shape with a restricted height are provided below a rear seat 234. The batteries 212 are used for the purpose of storing regenerative power from the drive motor 203 during deceleration of the vehicle 201. Also, the hydrogen tank 207 that is a gas container with a cylindrical appearance is disposed diagonally to the lower rear of the rear seat 234 so that its axial line is aligned with the vehicle width direction.

Below, the regulator 208 and the ejector 209 are collectively referred to as hydrogen supply auxiliary components D, and the humidifier 205 and the dilution box 211 are collectively referred to as air discharge auxiliary components E.

The drive motor 203 and the compressor 204 are disposed between the left and right front wheels 231 in the motor room MR (in the engine room, front region A of the vehicle) in the state of being mounted on a front sub-frame 250F. The fuel cell 202 and the auxiliary components therefor (the hydrogen supply auxiliary components D and the air discharge auxiliary components E) are disposed in the center portion in the vehicle width direction below a floor panel 235 (a region B below the floor of the vehicle) in the state of being mounted on the sub-frame 250. The hydrogen tank 207 is disposed below a rear floor 236 at the vehicle body rear portion (a region C at the rear of the vehicle) in the state of being mounted on a rear sub-frame 250R with the batteries 212. Left and right rear wheels 232 are supported with a suspension system at both sides of the hydrogen tank 207 in the rear sub-frame 250R.

A radiator 221 for cooling cooling water that circulates through the fuel cell 202 and the like is disposed in front of the drive motor 203 and the compressor 204.

Figure 23:
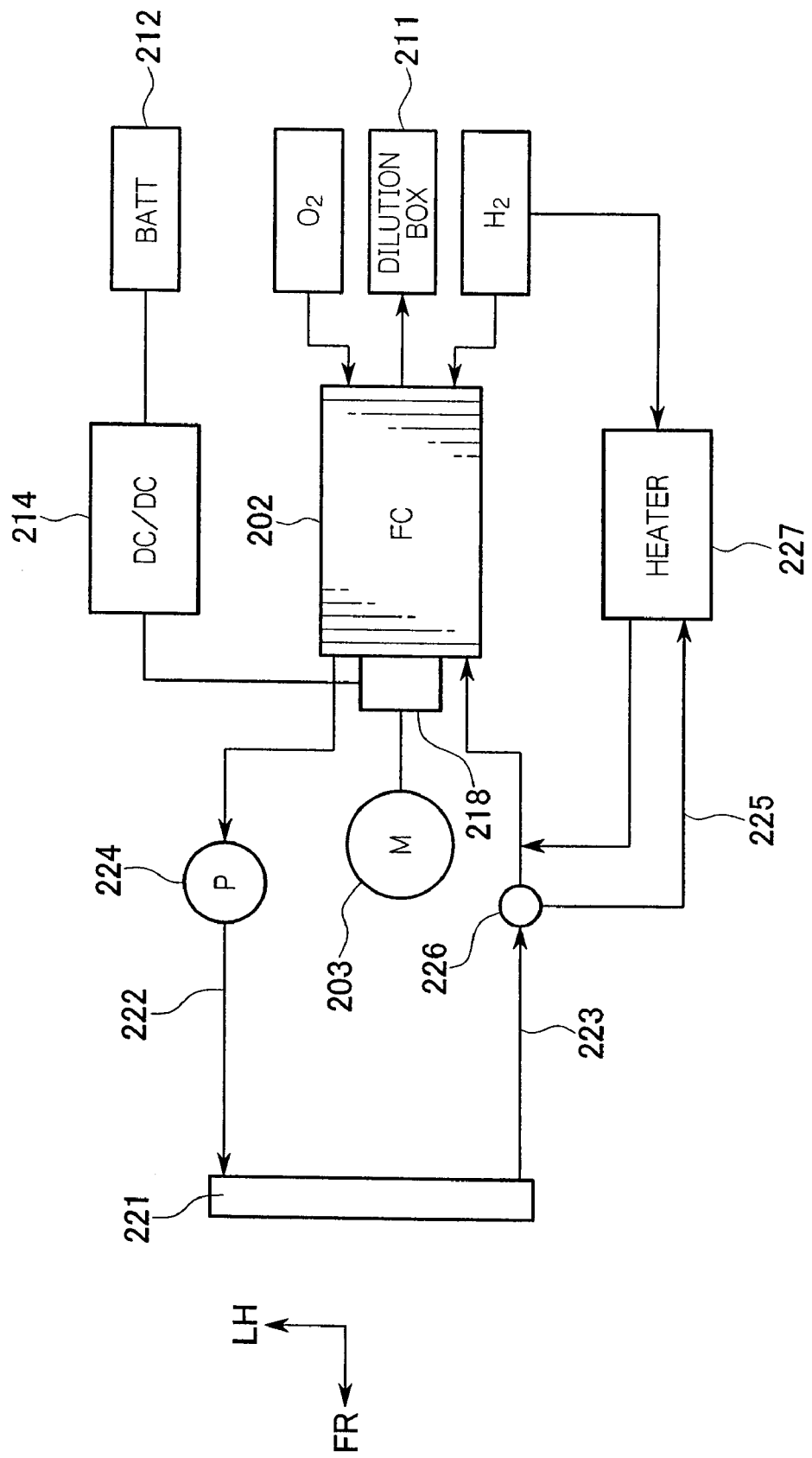
FIG. 23 is an undersurface explanatory drawing showing the arrangement of components according to the fuel cell system.

Referring in conjunction to FIG. 23, a cooling water flow-out pipe 222 and a cooling water flow-in pipe 223 running to the radiator 221 are connected to the front end portion of the fuel cell 202. A water pump 224 for circulating the cooling water is connected to the flow-out pipe 222. A switching valve 226 that opens a heater circulation path 225 during a cold start of the fuel cell 202 is disposed in the flow-in pipe 223. A heater 227 that heats by burning hydrogen from the hydrogen tank 207 is disposed in the heater circulation path 225, so that cooling water that passes the path 225 during a cold start of the fuel cell 202 is warmed.

Hydrogen gas and air are supplied from the rear end portion of the fuel cell 202, and reacted gas is discharged from the rear end portion to the dilution box 211. Thus the gas supply ports and reacted gas discharge port are collectively disposed at the rear end portion of the fuel cell 202, and the cooling water inlet/outlet are collectively disposed at the front end portion of the fuel cell 202. Thereby, the layout of piping connected to the fuel cell 202 can be streamlined, and weight savings in the vehicle 201 can be achieved by reducing the amount of cooling water retained therein.

Figure 24:
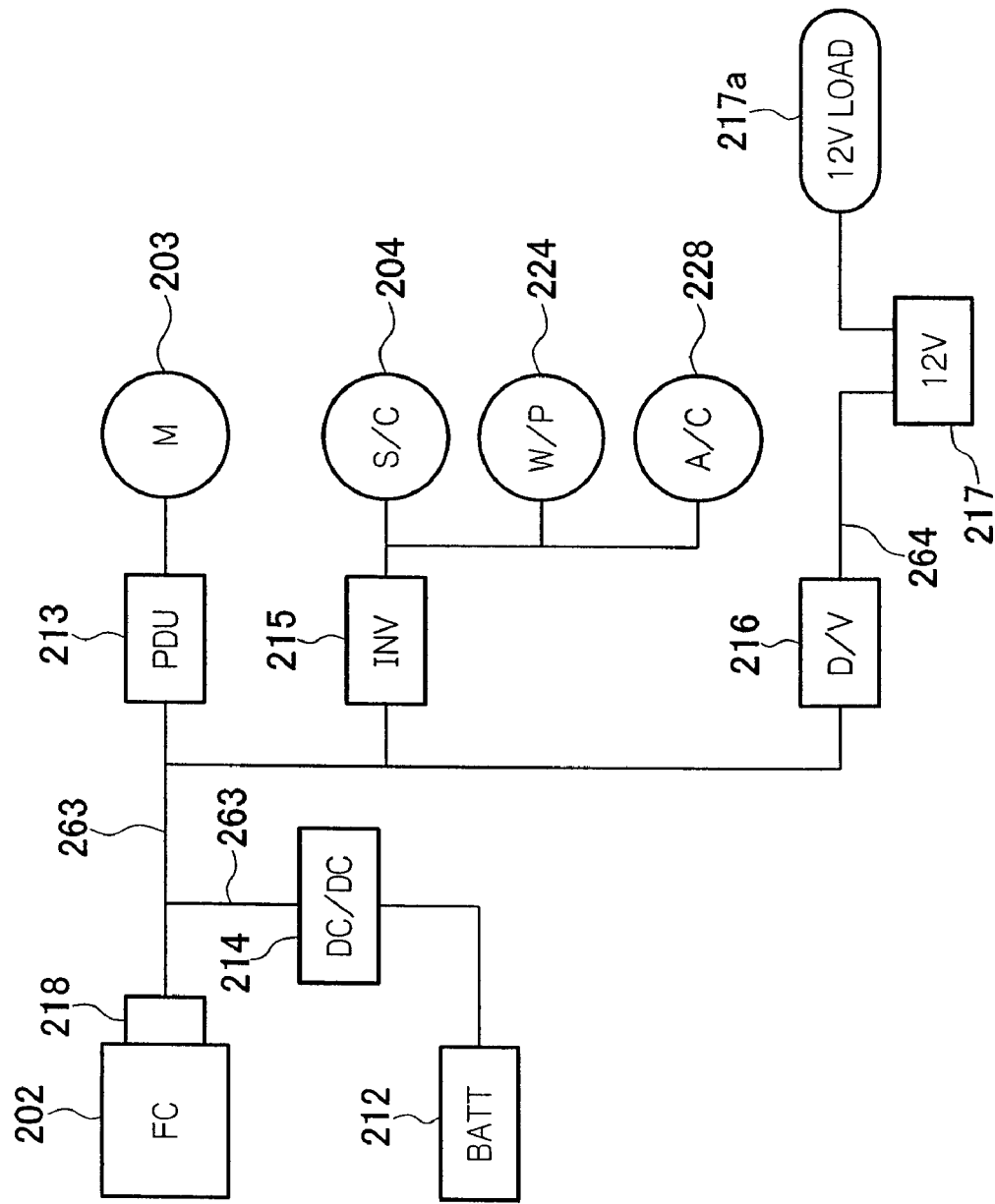
FIG. 24 is a schematic view including the components connected to the fuel cell system.

As shown in FIG. 24, driving or regeneration of the drive motor 203 is controlled by a power drive unit (PDU) 213 in accordance with the drive state of the vehicle and the electrical energy from the fuel cell 202 and the batteries 212.

The PDU 213 is equipped with an inverter that has switching elements such as field-effect transistors (FETs) to convert the direct current power from the batteries 212 and the fuel cell 202 to the desired alternating current power and regulate the voltage. Voltage regulation is performed by a DC-DC converter 214 between the fuel cell 202 and the batteries 212, and between the batteries 212 and the drive motor 203.

The direct current power from the fuel cell 202 is converted to alternating current power via an inverter 215 and supplied to specified electrically powered drive components, and stepped down by a downverter 216 to be supplied to a 12V battery 217. The specified electrically powered drive components include for example the compressor 204, the water pump 224, and a compressor 228 for the cabin air conditioner. Also, a 12V load 217a supplied with power from the 12V battery 217 includes, for example, the valves 206 and 226 and various lamplights. The reference numeral 218 in the drawing denotes a contactor box that restricts the electrical power supply from the fuel cell 202 as needed.

The PDU 213, the DC-DC converter 214, the inverter 215, the downverter 216, and the contactor box 218 are connected to an electrical control unit (ECU) 219 (see FIGS. 26 and 27) that controls the operation of the entire fuel cell system. The ECU 219 controls the driving of the aforementioned components based on a throttle opening signal, a breaking signal, and a vehicle speed signal or the like. Thereby, electrical generation control in the fuel cell 202 and regenerative power control in the drive motor 203 are performed.

Figure 26:
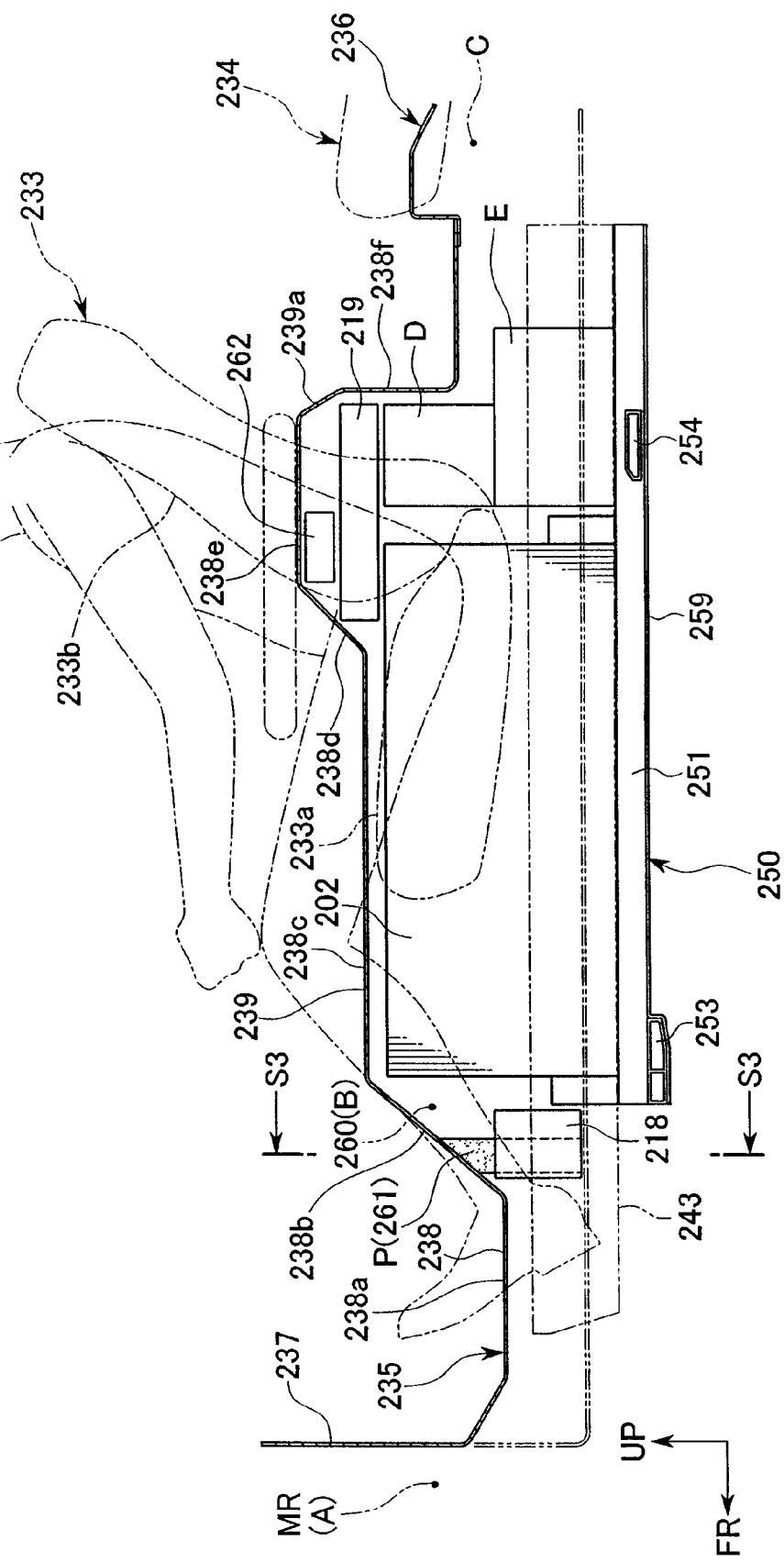
FIG. 26 is a cross-sectional view taken along the line S1-S1 in FIG. 25.

As shown in FIG. 26, a center console 239 is formed in the center of the floor panel 235 in the vehicle width direction, extending in the longitudinal direction from the bottom end portion of a dash lower 237 to just before rear seat 234 and bulging upward. The center console 239 has a U-shape cross section opening downward, with a center tunnel (floor tunnel) 260 being formed in the space therebelow. Since the front end portion of the center console 239 abuts the bottom end portion of the dash lower 237, the center tunnel 260 opens to the motor room MR. The rear end portion of the center tunnel 260 opens to under the rear floor 236 that extends from under the rear seat 234 to the vehicle body rear portion.

The fuel cell stack 202 and the auxiliary components thereof mounted on the sub-frame 250 are disposed in the space on the lower side of the center console 239.

Thus by disposing the fuel cell 202 and the auxiliary components in the center tunnel 260 located in the center portion of the vehicle width direction, the fuel cell 202 and the auxiliary components can be disposed with sufficient clearance from the vehicle body side surfaces, and a vehicle body layout that takes into account side collision response can be readily implemented. Also, the fuel cell 202 is disposed between front seats 233 in the vehicle cabin, above the floor level, and isolated from the space for the occupants by the center console 239. Therefore, the fuel cell 202 can be protected and made to be not easily accessible by the occupants.

Figure 25:
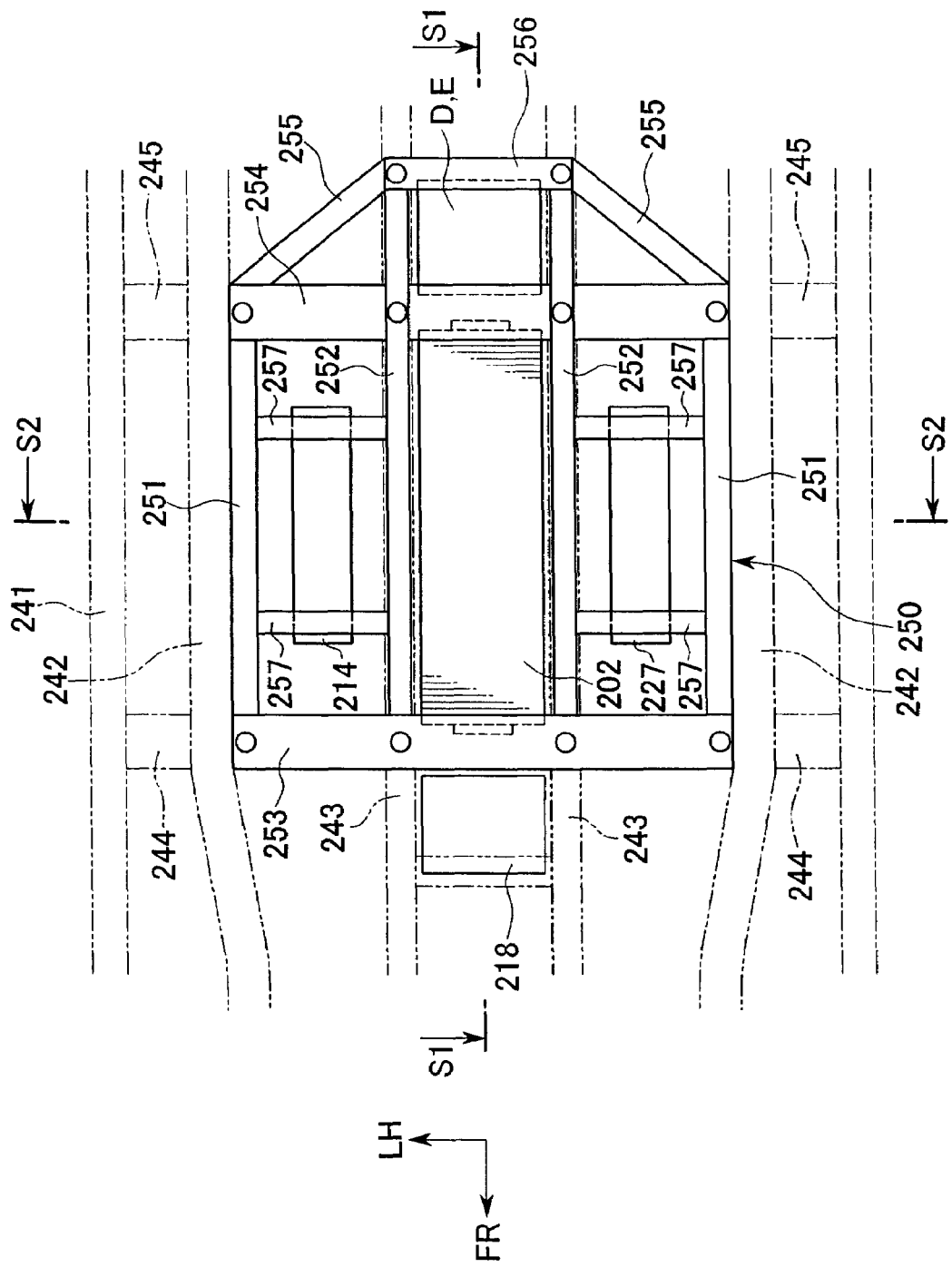
FIG. 25 is a view of the undersurface of the vehicle body of the third embodiment.
Figure 27:
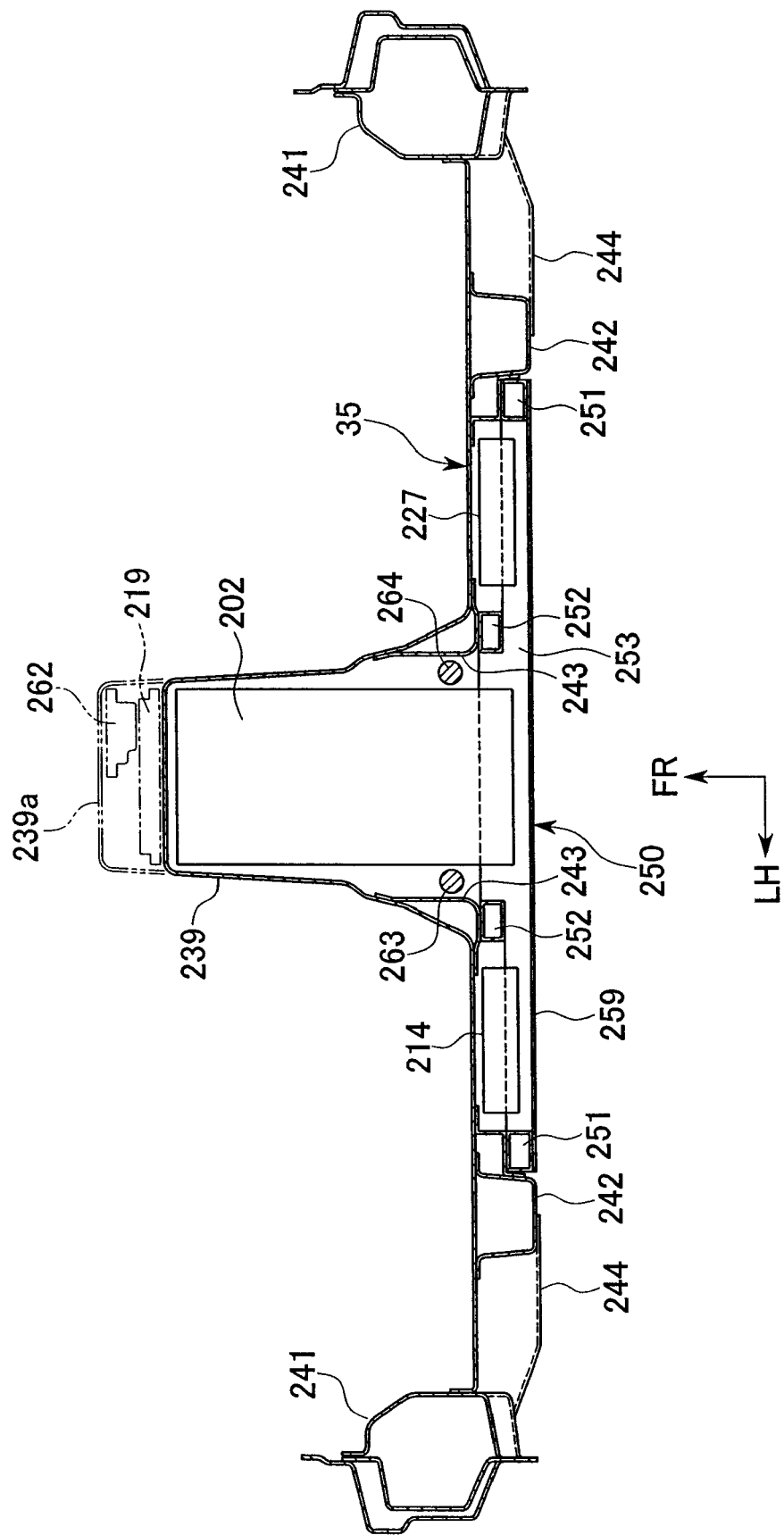
FIG. 27 is a cross-sectional view taken along the line S2-S2 in FIG. 25.

Explaining with reference to both FIGS. 25 and 27, the sub-frame 250 integrally joins a plurality of beam members disposed horizontally. Under the floor panel 235, left and right side frames 242 extend forward and rearward to the inside of side sills 241 located on the outside in the vehicle width direction. Left and right center frames 243 extend in the longitudinal direction to the inside of the side frames 242 in the vehicle width direction and at the bottom edge portions of the center console 239, supporting both bottom edge portions. A sub-frame 250 is fastened by bolts and nuts to the side frames 242 and the center frames 243. When doing so, the center tunnel 260 is formed with its front and rear ends open, having the center console 239 serve as the top wall and the upper portions of both side walls, the center frames 243 serve as lower portions of both side walls, and the sub-frame 250 as the bottom wall.

In greater detail, the sub-frame 250 has left and right sub-side frames 251 located at the bottom of the left and right side frames 242 and extending (in the longitudinal direction) over the entire length of the fuel cell 202; left and right sub-center frames 252 located under the left and right center frames 243 and extending (in the longitudinal direction) further to the rear than the sub-side frames 251; front and rear sub-cross frames 253 and 254 disposed along the vehicle width direction between the front end portions and the rear end portions of the sub-side frames 251 to join the sub-side frames 251 and the sub-center frames 252; left and right gusset pipes 255 obliquely disposed between the rear end portions of the sub-side frames 251 and the rear end portions of the sub-center frames 252; an end pipe 256 disposed in the vehicle width direction between the rear end portions of the sub-center frames 252; and front and rear intermediate pipes 257 disposed between the sub-cross frames 253 and 254 along the vehicle width direction, connecting each sub-side frame 251 and each sub-center frame 252.

The front and rear end portions of the sub-side frames 251 (the joints with the sub-cross frames 253 and 254) are joined to the side frames 242 using bolts and nuts. The joints of the front and rear end of the sub-center frames 252 (the joints with the front sub-cross frame 253 and the end pipe 256) and the joints with the rear sub-cross frame 254 are joined to the center frames 243 using bolts and nuts. Outriggers 244 and 245 are disposed at both sides of the sub-cross frames 253 and 254, being provided between the side frames 242 and the side sills 241 on the outer side thereof in the vehicle width direction to integrally couple them. In the state of the sub-frame 250 being attached, the side sills 241, the side frames 242, and the center frames 243 are integrally coupled by means of the outriggers 244 and 245 and the front and rear sub-cross frames 253 and 254.

As shown in FIGS. 26 and 27, an undercover 259 that covers at least the bottom of the center console 239 is attached to the undersurface of the sub-frame 250. The center tunnel 260 is formed under the floor panel 235 by the center console 239, center frames 243, sub-center frames 252, and the undercover 259, and extends in the vehicle longitudinal direction so that the front end portion opens to the motor room MR and the rear end portion opens to below the rear floor 236. With the front and rear ends of the center tunnel 260 thus being open, the vicinity of the fuel cell 202 and the auxiliary components thereof within the center tunnel 260 are naturally ventilated. In addition, the rotation of the fan of the radiator 221 prevents hydrogen in the center tunnel 260 from flowing into the motor room MR, and inhibits the increase of hydrogen concentration in the motor room MR. Furthermore, when a hydrogen sensor 262 disposed at the uppermost portion in the center tunnel 260 detects an increase of hydrogen concentration in the tunnel 260, the hydrogen concentration can be effectively lowered by rotating the fan of the radiator 221.

In the fuel cell vehicle 201, the floor panel 235 (including the center console 239) abuts the dash lower 237, and so the center tunnel 260 opens to the inside of the motor room MR. However, a partition wall 261 that blocks the movement of hydrogen gas in the center tunnel 260 (the underfloor region B) into the motor room MR (front region A) is provided at the front portion of the center tunnel 260 to restrict hydrogen emanating from the fuel cell 202 in the center tunnel 260 from flowing into the motor room MR.

The top wall of the center console 239 continuously forms a first inclined portion 238b that rises from a first horizontal portion 238a near the feet of the occupants sitting in the front seats 233 diagonally upward to the rear (an inclined portion that descends forward toward the vehicle front), and thereafter continuously forms a horizontal first top wall portion 238c that is positioned near the top surface of a seat cushion 233a of the front seats 233. Also, after the first top wall portion 238c, the top wall of the center console 239 continuously forms a second inclined portion 238d that rises diagonally upward to the rear just before the front surface of a seatback 233b of the front seats 233. Thereafter, the top wall of the center console 239 continuously forms at a position higher than the top surface of the seat cushion 233a a horizontal second top wall portion 238e that traverses the front and back of the seatback 233b, and then continues into the rear floor 236 under the rear seat 234 via a drop wall portion 238f that drops downward. The partition wall 261 is provided below the first inclined portion 238b and blocks the movement of hydrogen gas emanating from the center tunnel 260 into the motor room MR.

The contactor box 218 is disposed at the front end side in the center tunnel 260 (in front of the fuel cell 202 and below the first inclined portion 238b). The contactor box 218 is not mounted on, the sub-frame 250, being directly mounted on the vehicle body frame immediately before the sub-frame 250.

Figure 28:
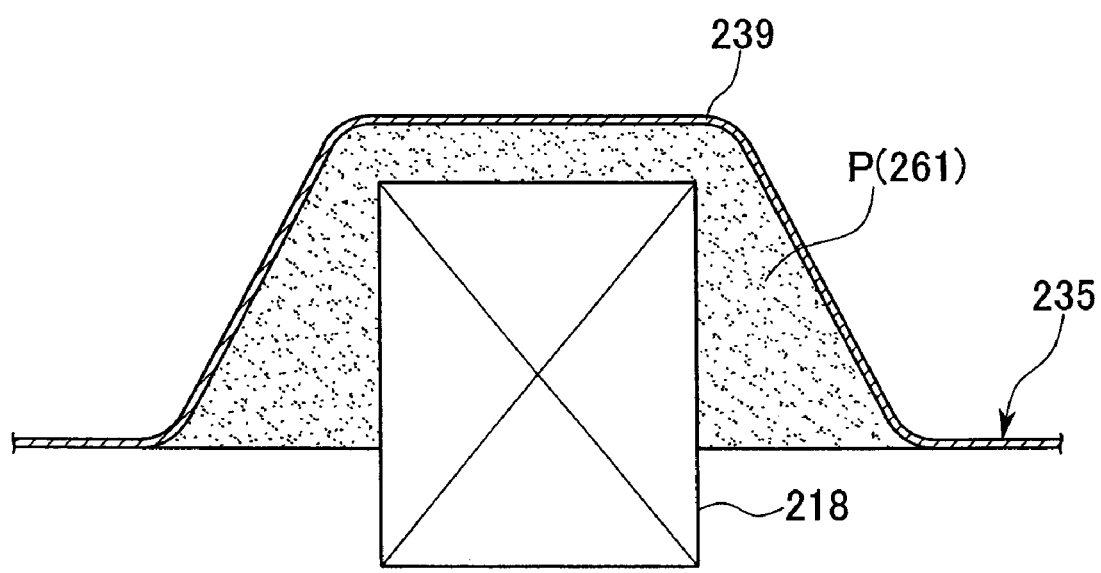
FIG. 28 is a cross-sectional view taken along the line S3-S3 in FIG. 26.

Referring in conjunction to FIG. 28, a foam material P is filled within the front end portion of the center console 239 so as to cover the top of the contactor box 218, so that the partition wall 261 is constituted with this contactor box 218 and the foam material P.

As shown in FIG. 25, the heater 227 is disposed under the floor panel 235 on the right side of the fuel cell 202 positioned in the center tunnel 260 (the center portion in the vehicle width direction). The DC-DC converter 214 is disposed under the floor panel 235 on the left side of the fuel cell 202.

The fuel cell 202 is disposed between the front and rear sub-cross frames 253 and 254, between the left and right sub-center frames 252, and the auxiliary components for the fuel cell 202 are disposed between the rear sub-cross frame 254 and the end pipe 256, between the left and right sub-center frames 252. The heater 227 and the DC-DC converter 214 are disposed between the front and rear sub-cross frames 253 and 254, between the left sub-side frame 251 and the left sub-center frame 252, and between the right sub-side frame 251 and the right sub-center frame 252, respectively, being supported by the front and rear intermediate pipes 257.

Referring in conjunction to FIG. 26, the front and rear ends of the fuel cell 202 are fixed to the sub-frame 250 by brackets or the like in the state of being directly mounted onto the sub-frame 250. Among the auxiliary components for the fuel cell 202 located behind the fuel cell 202, the air discharge auxiliary components E are directly mounted on the sub-frame 250, and the hydrogen supply auxiliary components D are disposed on the auxiliary components E.

An upper bulging portion 239a that supports an occupant armrest and the like is formed by the top wall portion at the upper rear side of the center console 239 bulging further upward through the second inclined portion 238d. The ECU 219, which is the control device of the fuel cell 202, is disposed in the upper bulging portion 239a. The ECU 219 is provided so as to span from the top of the rear end portion of the fuel cell 202 to the top of the hydrogen supply auxiliary components D. The hydrogen sensor 262 for detecting hydrogen in the center tunnel 260 is disposed on the ECU 219 in the vicinity of the inner surface of the top wall of the upper bulging portion 239a (in other words, at the uppermost portion of the center tunnel 260). The hydrogen sensor 262 is disposed above the gap between the rear end of the fuel cell 202 and the auxiliary components thereof in the vehicle longitudinal direction. Thus, when hydrogen emanates from either of the fuel cell 202 and the auxiliary components thereof, it can be favorably detected by the hydrogen sensor 262. Also, since the auxiliary components are disposed from the bottom in the order of their relative durability to water, mud or the like splashed up from the road surface, effects from the road surface can be suppressed for those components for which greater protection is sought.

As shown in FIGS. 24 and 27, a high-voltage line 263 connected to high voltage components such as the DC-DC converter 214 disposed on the right side of the fuel cell 202 is routed so as to extend forward and rearward in the gap between the lower right side of the fuel cell 202 and the right center frame 243 in the center console 239. Meanwhile, a low-voltage line 264 connected to low voltage components such as lamplights via the downverter 216 is similarly routed so as to extend forward and rearward in the gap between the lower left side of the fuel cell 202 and the left center frame 243.

The fuel cell 202 has electromagnetic shielding properties since its periphery is covered with a metal panel. Since the high-voltage line 263 is disposed on one side and the low-voltage line 264 on the other side so as to sandwich the fuel cell 202, noise generated from the high-voltage line 263 is prevented from influencing the low-voltage line 264. Moreover, since the DC-DC converter 214 that supplies high voltage power to the motor and the low-voltage line 264 are disposed on different sides of the fuel cell 202 to sandwich it, the influence of noise on the low voltage line 264 can be even further suppressed.

According to the constitution of the above-described third embodiment, by forming the center tunnel 260 with its front and rear ends open, having the center console 239 serve as the top wall and the upper portions of both side walls, the center frames 243 serve as lower portions of both side walls, and the sub-frame 250 as a bottom wall, and disposing the fuel cell 202 and the hydrogen supply auxiliary components D in the center tunnel 260, it is possible to circulate outside air around the fuel cell 202 and the hydrogen supply auxiliary components D, and so natural ventilation in the center tunnel 260 can be performed.

Also, by disposing the hydrogen sensor 262 on the inside top portion of the center console 239 housing the fuel cell 202 and the hydrogen supply auxiliary components D, even if hydrogen emanates in the ambient atmosphere around the fuel cell 202 and the auxiliary components D it can be favorably detected.

Moreover, by positioning the fuel cell 202, the auxiliary components D and the sub-frame 250 below the hydrogen sensor 262, effects due to water, mud or the like splashed up from the road surface can be suppressed.

Also, by disposing the auxiliary components D to the rear of the fuel cell 202 and disposing the hydrogen sensor 262 above the auxiliary components D, the hydrogen sensor 262 is positioned at the rear of the fuel cell 202 together with the auxiliary components D. Therefore, effects due to water, mud or the like splashed up from the road surface can be suppressed, and even if hydrogen emanates in the ambient atmosphere from either of the fuel cell 202 and the auxiliary components D, it can be detected by this one hydrogen sensor 262.

Moreover, by having the section of the center console 239 where the hydrogen sensor 262 is disposed bulge upward, the hydrogen sensor 262 is thereby positioned at the uppermost portion in the center tunnel 260. This can raise the detection accuracy of the hydrogen sensor 262 even further.

The present embodiment disposes the fuel cell 202, which has electromagnetic shielding properties by being covered with an ordinary metal panel, in the center tunnel 260 in the center portion with respect to the vehicle width direction, and disposes the high-voltage line 263 and the low-voltage line 264 on the left and right sides thereof. Thereby, the influence of noise from the high-voltage line 263 on the low-voltage line 264 installed together with the high-voltage line 263 can be suppressed.

Also, even in the event of hydrogen being present in the ambient atmosphere of the fuel cell 202 disposed in the center console 239, flowing of the hydrogen into the motor room MR can be reliably suppressed by the partition wall 261, which partitions the center tunnel 260 and the motor room MR.

The partition wall 261 is provided under the first inclined portion 238b that inclines the center console 239 downwardly and forwardly toward the front of the vehicle. Thereby, since hydrogen is lighter than air in the atmosphere, the sloping of the top surface of the center console 239 toward the front can suppress the flow of hydrogen into the motor room MR of the vehicle, and so the flow of hydrogen into the motor room MR can be reliably restricted.

Also, the aforementioned constitution can suppress the effects due to water, mud or the like splashing up from the road surface with respect to the hydrogen supply auxiliary components D for which greater protection is sought.

Also, in the state of the fuel cell stack 202 and the auxiliary components thereof being mounted on the sub-frame 250, the number of assembly steps for attaching the fuel cell system to the vehicle can be reduced, and the vehicle body rigidity can be increased by having the sub-frame 250 function as a frame member of the vehicle body.

Since the fuel cell stack 202 and the auxiliary components thereof are disposed in the center tunnel 260 located in the center portion with respect to the vehicle width direction, clearance between the fuel cell stack 202 and auxiliary components thereof and the vehicle body side surfaces can be readily ensured, and a vehicle body layout that takes into account side collision response can be readily implemented.

The auxiliary components for the fuel cell 202 include the ECU 219 as a control device for controlling the electrical output of the fuel cell 202. By disposing the ECU 219 above the hydrogen supply auxiliary components D, the effects due to water, mud or the like splashing up from the road surface on the ECU 219 can be suppressed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell vehicle comprising:
a vehicle body;
a floor panel provided on a bottom of the vehicle body;
a floor tunnel that is formed bulging upward in a center of the floor panel in a vehicle body width;
a pair of front seats that are disposed on the floor panel, outside of the floor tunnel in a vehicle body width direction;
center frames that support the floor tunnel, disposed at a center in the vehicle body width and extending along a vehicle body longitudinal direction;
a sub-frame provided on the bottom of the floor panel and joined to the center frames;
a fuel cell stack mounted on the sub-frame and provided under the floor tunnel;
an auxiliary component of the fuel cell stack provided between one of the center frames and one of side frames; and
a connecting member that connects the fuel cell stack and the auxiliary component,
wherein a recess is provided in at least one of the center frames and the sub-frame, and the connecting member is disposed so as to pass through the recess.

2. A fuel cell vehicle comprising:
a vehicle body;
a floor panel provided on a bottom of the vehicle body;
a floor tunnel that is formed bulging upward in a center of the floor panel in a vehicle body width;
a pair of front seats that are disposed on the floor panel, outside of the floor tunnel in a vehicle body width direction;
center frames that support the floor tunnel, disposed at a center in the vehicle body width and extending along a vehicle body longitudinal direction;
a sub-frame provided on the bottom of the floor panel and joined to the center frames;
a fuel cell stack mounted on the sub-frame and provided under the floor tunnel; and
a partitioning member which blocks a communicative passage between the floor tunnel and a space at a front of the vehicle body, being provided under the floor tunnel;
wherein a top of the floor tunnel has an inclined portion that is formed to become lower toward the front of the vehicle body, and the partitioning member is provided under the inclined portion.

3. A fuel cell vehicle comprising:
a vehicle body;
a floor panel provided on a bottom of the vehicle body;
a floor tunnel that is formed bulging upward in a center of the floor panel in a vehicle body width;
a pair of front seats that are disposed on the floor panel, outside of the floor tunnel in a vehicle body width direction;
center frames that support the floor tunnel, disposed at a center in the vehicle body width and extending along a vehicle body longitudinal direction;
a sub-frame provided on the bottom of the floor panel and joined to the center frames;
a fuel cell stack mounted on the sub-frame and provided under the floor tunnel;
a hydrogen supply portion that supplies hydrogen to the fuel cell stack, being provided under the floor tunnel and at a rear of the fuel cell stack; and
a hydrogen sensor provided in the floor tunnel and above the hydrogen supply portion;
wherein the floor tunnel is formed so that an upper portion under which the hydrogen sensor is disposed is a highest portion.

4. A fuel cell vehicle according to claim 3, further comprising:
an air discharge portion provided under the floor tunnel and below the hydrogen supply portion.

5. A fuel cell vehicle according to claim 3, further comprising:
an electromagnetic shield member provided on a periphery of the fuel cell stack;
a high-voltage line disposed on a first side that is outside of the fuel cell stack in the width direction; and
a low-voltage line disposed on a second side being an opposite side of the first side.

6. A fuel cell vehicle according to claim 4, further comprising
an electrical control portion provided under the floor tunnel and above the hydrogen supply portion.

* * * * *